United States Patent
Wang et al.

(10) Patent No.: US 10,045,373 B2
(45) Date of Patent: Aug. 7, 2018

(54) PEER-TO-PEER COMMUNICATIONS ENHANCEMENTS

(71) Applicant: Convida Wireless, LLC, Wilmington, DE (US)

(72) Inventors: Chonggang Wang, Princeton, NJ (US); Hongkun Li, Malvern, PA (US); Qing Li, Princeton Junction, NJ (US); Paul L. Russell, Jr., Pennington, NJ (US); Zhuo Chen, King of Prussia, PA (US)

(73) Assignee: Convida Wireless, LLC, Wilmington, DE (US)

( * ) Notice: Subject to any disclaimer, the term of this patent is extended or adjusted under 35 U.S.C. 154(b) by 224 days.

(21) Appl. No.: 14/328,908

(22) Filed: Jul. 11, 2014

(65) Prior Publication Data
US 2015/0016359 A1    Jan. 15, 2015

Related U.S. Application Data

(60) Provisional application No. 61/845,688, filed on Jul. 12, 2013.

(51) Int. Cl.
*H04W 74/04* (2009.01)
*H04L 5/00* (2006.01)
*H04W 84/18* (2009.01)

(52) U.S. Cl.
CPC ........... *H04W 74/04* (2013.01); *H04L 5/0037* (2013.01); *H04L 5/0053* (2013.01); *H04W 84/18* (2013.01)

(58) Field of Classification Search
CPC ..... H04L 5/0037; H04L 5/0053; H04L 5/006; H04W 74/04; H04W 76/14; H04W 84/12; H04W 84/18
See application file for complete search history.

(56) References Cited

U.S. PATENT DOCUMENTS 8,467,357 B2    6/2013 Wang
2007/0165589 A1*   7/2007 Sakoda ................. H04W 48/08
                                                     370/345

(Continued)

FOREIGN PATENT DOCUMENTS

| JP | 2008-219389 A | 9/2008 |
| JP | 2011-507326 A | 3/2011 |
| WO | WO 2009-072089 A1 | 6/2009 |
| WO | WO 2015-006672 | 1/2015 |

OTHER PUBLICATIONS

Li, Q. "Final Proposals for IEEE 802.15.8", Project: IEEE P802.15 Working Group for Wireless Personal Area Networks (WPANs), Jul. 8, 2013, pp. 1-100.

(Continued)

*Primary Examiner* — Michael Thier
*Assistant Examiner* — Prince A Mensah
(74) *Attorney, Agent, or Firm* — Baker & Hostetler, LLP

(57) ABSTRACT

An enhanced general superframe structure for peer-to-peer communications in proximity is disclosed, which may be implemented in connection with a variety of different channel access techniques. Additionally, methods are disclosed for enabling multiple P2PNWs in proximity operating under different control schemes, including virtually centralized control, distributed control, and hybrid control, to co-exist. A hyperframe structure is also disclosed, which may comprise two or more superframes, each superframe corresponding to a different one of the corresponding P2PNW control schemes.

23 Claims, 21 Drawing Sheets

(56) References Cited

U.S. PATENT DOCUMENTS

| | | | | |
|---|---|---|---|---|
| 2010/0260085 A1* | 10/2010 | Wang | .................... | H04W 74/02 |
| | | | | 370/311 |
| 2010/0304772 A1* | 12/2010 | Wang | ................. | H04W 56/003 |
| | | | | 455/509 |
| 2012/0120892 A1* | 5/2012 | Freda | .................... | H04W 8/005 |
| | | | | 370/329 |
| 2013/0089048 A1* | 4/2013 | Damnjanovic | ......... | H04L 5/001 |
| | | | | 370/329 |
| 2013/0204962 A1* | 8/2013 | Estevez | ................. | H04N 7/185 |
| | | | | 709/217 |
| 2013/0308549 A1* | 11/2013 | Madan | ................. | H04W 28/26 |
| | | | | 370/329 |

OTHER PUBLICATIONS

Lee et al, "PAC Introduction", IEEE 802.15 SG Working Group for Wireless Personal Area Networks (WPANs), Jan. 18, 2012, pp. 1-20.

Lee, "Peer Aware communications (PAC) Study Group 5 Criteria", IEEE P802.15 Working Group for Wireless Personal Area Networks (WPANs), Jan. 20, 2012, pp. 1-4.

Heile, "Wireless Medium Access Control (MAC) and Physical Layer (PHY) Specifications for Peer Aware Communications (PAC)", IEEE P802.15.8 Wireless Personal Area Network (WPAN) Working Group (C/LM/WG802.15), Feb. 8, 2012, pp. 1-2.

Japanese Patent Application No. 2016-525801: Notice of Reasons for Rejection dated Feb. 24, 2017, 4 pages.

\* cited by examiner

PEER-TO-PEER COMMUNICATIONS ENHANCEMENTS

CROSS-REFERENCE TO RELATED APPLICATIONS

This application claims the benefit of U.S. Provisional Patent Application No. 61/845,688, filed on Jul. 12, 2013, entitled "Superframe Structure for Peer-to-Peer Communications," the content of which is hereby incorporated by reference in its entirety.

BACKGROUND

Peer-to-peer (P2P) proximity communication may refer to infrastructure-based or infrastructure-less communications between peers within proximity of each other. A peer may refer to a user or a device such as, for example, a mobile station (MS) in a 2G system, or a full-function device (FFD) or reduced-function device (RFD) in a IEEE 802.15 wireless personal area network (WPAN). Examples of P2P devices include connected cars, medical devices, smart meters, smart phones, tablets, laptops, game consoles, set-top boxes, cameras, printers, sensors, home gateways, and the like. P2P proximity communication may focus on a peer being aware of its proximity to desired services in an infrastructure-based or infrastructure-less configuration. For example, P2P communications may be implemented in a centralized system that includes a centralized controller or a fully distributed system without a central controller. In contrast to infrastructure-less P2P communications, infrastructure-based communications often include a centralized controller, for example, for handling user information, scheduling among users, and managing connections (e.g., cellular communications). In infrastructure-less P2P communications, peers typically have equal responsibility for initiating, maintaining, and terminating a communication session.

Proximity-based applications and services represent a recent socio-technological trend to offload heavy local internet traffic from a core infrastructure as well as provide the connections to an infrastructure via multi-hopping. Many standards have identified proximity services use cases as part of their standardization working groups, such as 3GPP, oneM2M, IETF, IEEE, and OMA. Service layer, as well as cross-layer techniques, is an area of standardization to enable these services. P2P proximity communications are used in various applications including, for example, social networking, advertising, emergency situations, gaming, smart transportation, and network of network scenarios.

In typical social network implementations, peers in proximity can interact with each other at the application level (e.g., Facebook, Twitter). Two-way communication among two or more peers is often required in social network implementations of P2P proximity communications. Traffic data rates may be low (e.g., text-based chatting) or high (e.g., content sharing). In an example advertising implementation of P2P proximity communications, a store broadcasts its promotions and coupons to potential customers (peers) who are within proximity to the store's location. In this example scenario, one-way communication with low data traffic is typical, but two-way communication may be used (e.g., for personalized advertisements).

Implementation of P2P proximity communications in emergency situations usually involves one-way communication, such as an emergency alarm for example. Other emergency implementations need two-way communication, such as during an emergency safety management scenario. An emergency service/application of P2P may have higher priority than other P2P services/applications, and some emergency services/applications may have higher privacy requirements. In an example gaming implementation of P2P, multiple peers initialize or participate in interactive games, such as online multiplayer gaming following certain rules for example. Interactive P2P gaming often requires low latency. In an example smart transportation implementation of P2P proximity communication, connected cars, via car-to-car and/or car-to-infrastructure communication, can support advanced applications including, for example, congestion/accident/event notification, interactive transportation management such as carpooling and train scheduling, smart traffic control, and the like. Data rates in smart transportation implementations are often low, but smart transportation may require highly reliable message delivery and very low latency. Network-to-Network P2P may be used for extending the coverage of an infrastructure or offloading from the infrastructure.

IEEE 802.15.8 aims to specify Physical layer (PHY) and Medium Access Control (MAC) protocols for fully distributed peer-aware communications to support the emerging services discussed above, including social networking, advertising, gaming, streaming, emergency services, and the like. Some of the features of IEEE 802.15.8 include (i) discovery for peer information without association, a typical discovery signaling rate of greater than 100 kbps, and the ability to handle a number of devices in the discovery of more than 100 devices, (ii) scalable data transmission rates of, e.g., typically 10 Mbps, (iii) group communications with simultaneous membership in multiple groups (typically up to 10), (iv) relative positioning, multi-hop relay, security, and (v) operational in selected globally available unlicensed/licensed bands below 11 GHz and capable of supporting these requirements.

SUMMARY

In accordance with one aspect of the present application, an enhanced general superframe structure for peer-to-peer communications in proximity is disclosed. The enhanced superframe structure may be implemented in connection with a variety of different channel access techniques, including time division multiple access (TDMA), orthogonal frequency-division multiplexing, and direct-sequence spread spectrum.

In accordance with another aspect of the present application, methods are disclosed for enabling multiple P2PNWs in proximity operating under different control schemes, including virtually centralized control, distributed control, and hybrid control, to co-exist. In particular, one method enables the coexistence of P2PNWs operating under both distributed control and virtually centralized control. Another method enables the coexistence of P2PNWs operating under both virtually centralized control and hybrid control. Yet another method enables the coexistence of P2PNWs operating under both distributed control and hybrid control. Still another method enables the coexistence of P2PNWs operating under all three of the different control schemes.

In accordance with yet another aspect of the present application, the concept of a hyperframe is disclosed. In various embodiments, a hyperframe may comprise two or more superframes, each superframe corresponding to a different one of the corresponding P2PNW control schemes described herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to embodiments that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Terminology

Figure 1:
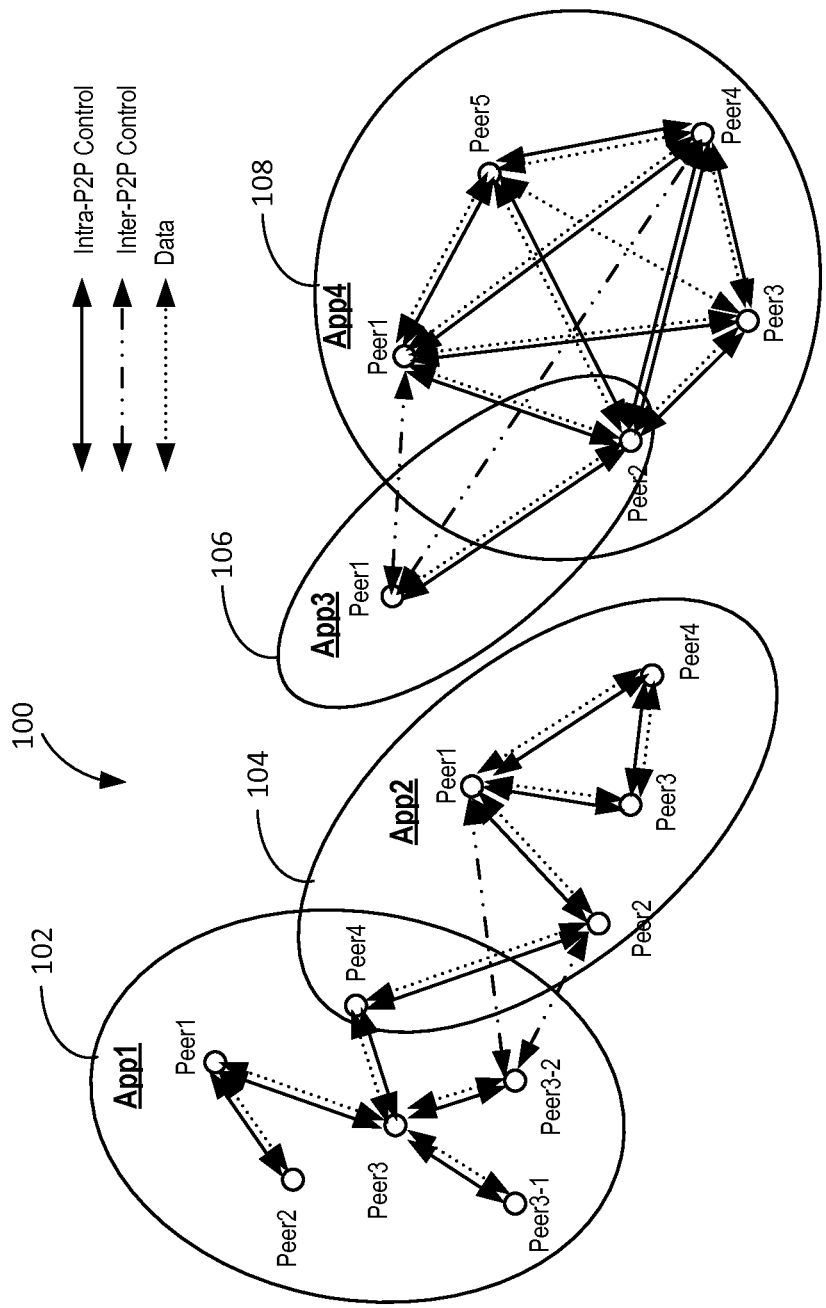
FIG. 1 illustrates an example communication system in which a distributed control scheme is employed.

As used herein, the term "Application Beacon" refers to a beacon that indicates the start of an application frame. The term "application frame" refers to a frame structure dedicated to a specific application for P2P communications in proximity. An application frame may contain a Contention Period (CP), referred to herein as a Dedicated Control and Data Channel (DCDCH) and/or a Contention Free Period (CFP), and an Inactive Period, i.e., a gap or guard period. Both DCDCH and CFP are allocated with a certain amount of time slots, respectively, which may be predefined or adjusted through channel allocation and/or channel accessing management. The length of DCDCH and CFP may be indicated in an Application Beacon.

As used herein, "context" refers to a service, user, device, proximity, or the like. "channel accessing" refers to procedures or actions to physically connect to a physical communication channel to transmit or receive signals or data in a wireless communication system. "Channel allocation" refers to procedures to define or assign the physical communication channel(s) to a terminal or multiple terminals for transmitting or receiving signals or data in a wireless communication system. A terminal accesses a channel allocated to it.

As used herein, the term "hyperframe" refers to a next level above a superframe(s) in a hierarchical frame structure illustrated herein for a network of P2P networks. A hyperframe may contain one or multiple different kinds of superframes, such as, for example, a virtually centralized control superframe, a hybrid control superframe, and/or a distributed control superframe, or any combination of these.

As also used herein, the term "peer discovery" refers to a procedure used for a peer to find another peer(s) before peer association or attachment to enable P2P communication in proximity. This procedure is sometimes also referred to as neighbor discovery.

"Peer association" refers to a procedure used for a peer to establish a logic connection with another peer(s) before peer data transmission for P2P communication. This procedure may also be referred to as peer attachment, pairing, peering, link establishment, and the like. The term "peer association update" refers to a procedure used for a peer to update an Association Identifier and/or Association Context of an existing association relationship with other peer(s). "Peer disassociation" refers to a procedure(s) used for a peer to cancel an existing association relationship with other peer(s). "Peer re-association" refers to procedure(s) used for a peer to re-associate a cancelled association relationship with other peer(s).

The term "virtual leader (VL)" refers to a peer defined to represent, manage, and coordinate the P2P communications among a group of peers sharing the same context-based service or application, i.e. within a P2PNW, for centralized intra-P2PNW control. A virtual leader may be dynamically determined and/or changed within the group (P2PNW). A virtual leader performs functions for the group (P2PNW) such as context management, context-aware discovery broadcast, context-aware peer association, group membership management, synchronization, link management, channel allocation and accessing control, reliable data transmission, routing management, power control and interference management, and channel measurement coordination, etc. A peer can only be the virtual leader for one application (P2PNW), and one application (P2PNW) can have only one virtual leader. Other alternative terms for virtual leader include group leader/header/controller/coordinator/master/manager, cluster leader/header/controller/coordinator/master/manager, zone leader/header/controller/coordinator/master/manager, and the like.

The term "super virtual leader (SuperVL)" refers to a virtual leader defined to coordinate all virtual leaders of P2PNWs in proximity for centralized inter-P2PNWs control, for the purposes of synchronization, power control, interference management, channel allocation, accessing control, and the like. A super virtual leader may be dynamically determined and/or changed among the virtual leaders in proximity. The super virtual leader is the top leader of the virtual leaders' hierarchical structure for centralized inter-P2PNWs control. A super virtual leader can also coordinate across virtual leaders that manage multiple applications (P2PNWs).

The term "sub-virtual leader (SubVL)" refers to a peer defined to extend coverage through multi-hop communications based on the physical or logical topology for centralized intra-P2PNW control. The roles of a sub-virtual leader include one or more, up to all, of: (1) as a virtual leader to manage a subgroup of peers with the same context-based service or application (P2PNW); and (2) as a peer (i.e. a member) under the management of the virtual leader and/or a sub-virtual leader of the same group (P2PNW). The sub-virtual leader may perform a subset of functions of the virtual leader.

As also used herein, the term "superframe" refers to a next level above application frame(s) in a hierarchical frame structure illustrated and described herein for a network of P2P networks. In one embodiment, a superframe may contain a contention-based Common Period (CP), i.e. a Common Control and Data Channel (CCDCH), one or multiple application frames, a Reserved Time (RT) field, and/or an Inactive Period. The term "Superframe Beacon" refers to a beacon that may be used to indicate the start of a superframe as described herein. A Superframe Beacon may be maintained by a super virtual leader as a Super Beacon, by a virtual leader (VL) as a Common Beacon, or by a peer as a Common Peer Beacon. In an embodiment, the Superframe Beacon may also contains a Hyperframe Indicator to indicate the start of a hyperframe if is set to true.

Control Schemes for P2P Communications

Three different control schemes for managing channel access among different P2P networks (P2PNWs) have been proposed in connection with the IEEE 802.15.8 standard—distributed control, virtually centralized control, and hybrid control.

FIG. 1 illustrates an example communication system 100 in which the distributed control scheme is employed, which may include both distributed inter-P2PNWs control and intra-P2PNW control. In the example system shown, there are four P2PNWs 102, 104, 106, and 108. Each P2PNW 102, 104, 106, 108 implements a respective P2P application, such as App1, App2, App3, and App4, respectively. A peer may be a tablet, smart phone, music player, game console, personal digital assistant, laptop, PC, medical device, connected car, smart meter, home gateway, monitor, alarm, sensor, set-top box, printer, a mobile station (MS) in a 2G network, a user equipment (UE) in a 3G network, or one or a group of full-function devices (FFDs) or reduced-function devices (RFDs) in IEEE 802.15 (wireless personal area network (WPAN)) networks. As one example, a peer may have the hardware architecture illustrated in FIG. 14C (described more fully below) or a variation thereof, or it may have the architecture of the computing system illustrated in FIG. 14D (also described more fully below).

In the distributed control scheme illustrated in FIG. 1, each peer of a P2PNW manages all control related communications with other peers of P2PNWs in proximity, by communicating with the other peers on a Common Control/Data Channel (CCDCH). The CCDCH may be used for, but not limited to, the following: common control messages among the P2PNWs in proximity, paging or broadcast messages to the P2PNWs in proximity, and short high priority data broadcasted to the P2PNWs in proximity.

With distributed inter-P2PNWs control, a peer within one P2PNW manages its control-related communications with the peers within other P2PNWs in proximity. For example, in FIG. 1, Peer 3-2 in P2PNW 102 communicates control-related information with Peer 1 and Peer 2 of P2PNW 104. Similarly, Peer 1 of P2PNW 106 communicates control-related information with Peer 1 and Peer 4 in P2PNW 108. In such a distributed control scheme, there is no SuperVL acting as a central "controller" among P2PNWs.

With distributed intra-P2PNW control, a peer manages its control related communications by communicating with other peers within a P2PNW, as shown by the solid, double-arrow lines. For example, Peer1 of App4 in P2PNW 108 handles both control and data messages with the peers within that App4 P2PNW. There is no VL acting as a central "controller", nor any SubVL either.

Figure 2:
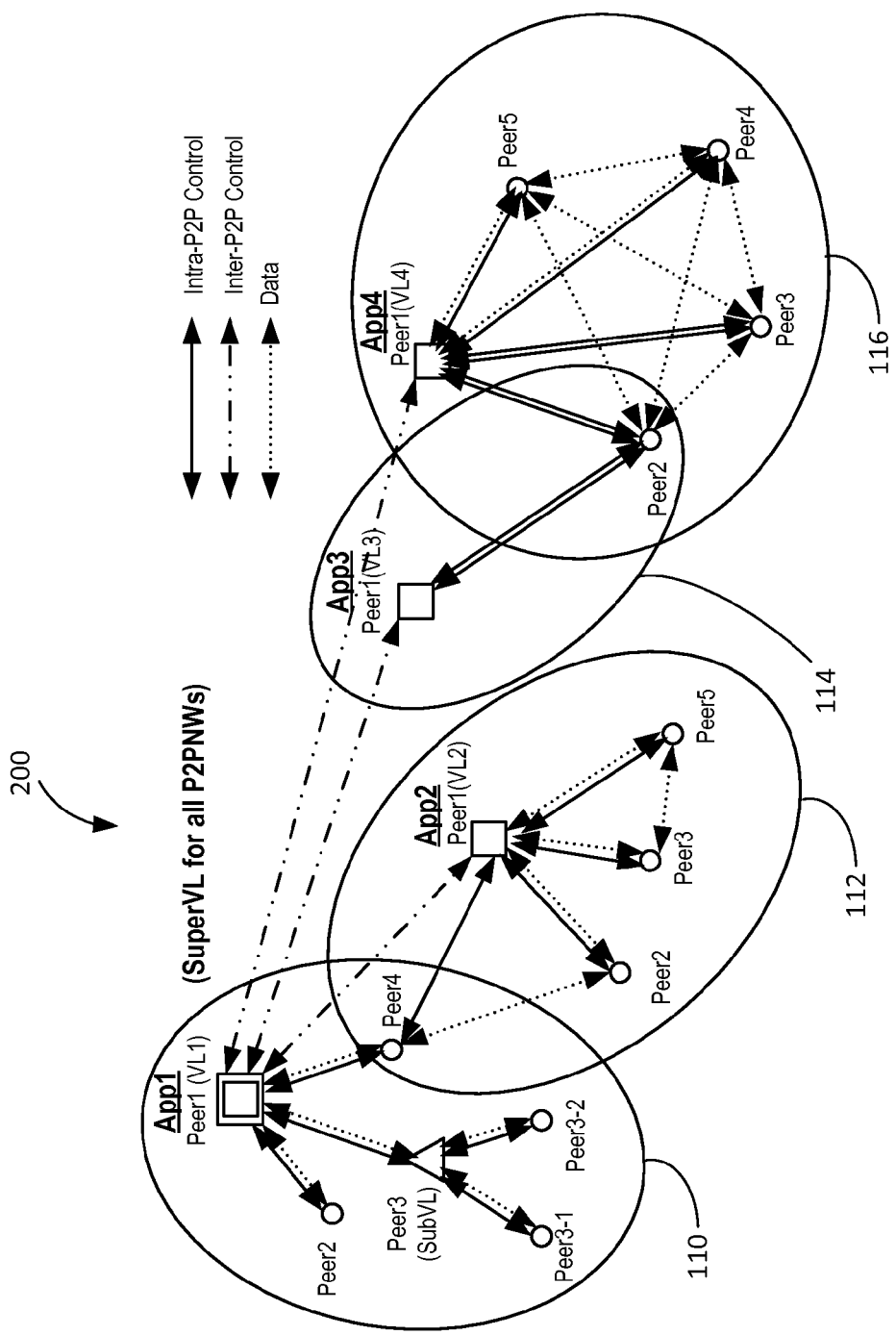
FIG. 2 illustrates an example communication system in which a virtually centralized control scheme is employed.

FIG. 2 illustrates an example communication system 200 in which the virtually centralized control scheme is employed, which may include both centralized inter-P2PNWs control and intra-P2PNW control. In the example system shown, there are four P2PNWs 110, 112, 114, and 116. As in the previous example, each P2PNW 110, 112, 114, 116 implements a respective P2P application, such as App1, App2, App3, and App4, respectively.

With centralized inter-P2PNWs control, a super VL manages all control related communications among the P2PNWs in proximity, via communications with other VLs of P2PNWs on a Common Control/Data Channel. For example, Peer 1 in P2PNW 110 (implementing App1) is the SuperVL and handles all control signals and/or messages among the App1, App2, App3 and App4 P2PNWs 110, 112, 114, and 116. Specifically, as shown, the SuperVL (Peer 1 of P2PNW 110) communicates on the CCDCH with Peer 1 (VL2) of App2 P2PNW 112, with Peer 1 (VL3) of App3 P2PNW 114, and with Peer 1 (VL4) of App4 P2PNW 116.

With centralized intra-P2PNW control, a VL manages all control related communications directly or through SubVL(s) within a P2PNW, via communications with other peers of the P2PNW on a Dedicated Control/Data Channel (DCDCH). For example, Peer1 of App1 P2PNW 110 handles all control signals and/or messages among the peers (e.g., Peers 2 and 4) and SubVL (e.g., Peer 3) within App1 P2PNW. Peer 3 is a SubVL for Peers 3-1 and 3-2. Similarly, Peer1 of the App4 P2PNW 116 handles all control signals and/or messages among all peers (Peers 2, 3, 4, and 5) within the App4 P2PNW 116.

Figure 3:
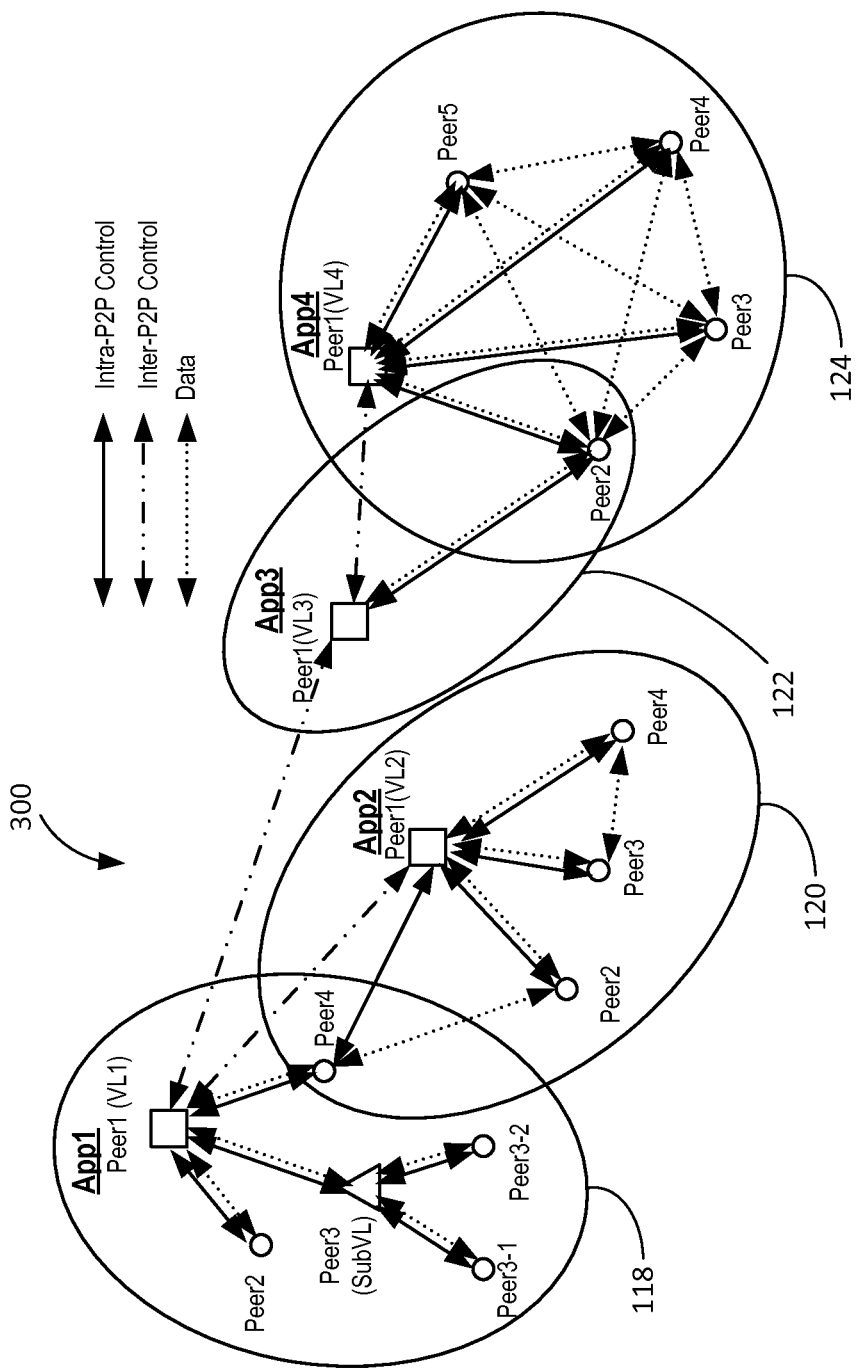
FIG. 3 illustrates an example communication system in which a hybrid control scheme is employed.

FIG. 3 illustrates an example communication system in which the hybrid control scheme is employed, which may include both distributed inter-P2PNWs control and virtually centralized intra-P2PNW control. In the example shown, there again are four P2PNWs 118, 120, 121, and 122. As in the previous example, each P2PNW 118, 120, 122, and 124 implements a respective P2P application, such as App1, App2, App3, and App4, respectively.

In the distributed inter-P2PNW control of this hybrid control scheme, the VL of a P2PNW manages its P2PNW's control related communications with the VLs of other P2PNWs in proximity, via communications on the CCDCH. There is no SuperVL acting as a central "controller" among P2PNWs, and the VL of a given P2PNW is only a central "controller" within that P2PNW. For example, as shown, Peer 1 (VL1) of the App1 P2PNW 118 communicates with Peer 1 (VL2) of App2 P2PNW 120, with Peer 1 (VL3) of App3 P2PNW 122, and with Peer 1 (VL4) of App3 P2PNW 124.

In the centralized Intra-P2PNW control of the hybrid control scheme, a VL manages all control related communications directly or through SubVL(s) within a P2PNW on the Dedicated Control/Data Channel. For example, Peer1 of App1 P2PNW 118 handles all control signals and/or messages among the peers (e.g., Peers 2 and 4) and SubVL (e.g., Peer 3) within that App1 P2PNW. Similarly, Peer1 of App4 P2PNW 124 handles all control signals and/or messages among all peers (e.g., Peers 2, 3, 4, and 5) within that App4 P2PNW.

Channel Management and Superframe Structure

In 802.15.8, channel management is used for channel resource allocation among peers. A superframe is defined during the channel management process. Generally, the superframe consists of a Super Beacon (in centralized control) or Common Beacon (in hybrid and distributed control) that defines the start point of a new superframe. The Super Beacon or Common Beacon is then followed by the CCDCH. Following the CCDCH are one or more application frames. Each application frame may contain an Application Beacon, a DCDCH that is for intra-P2PNW communications and shared by the VL, SubVLs and peers within a P2PNW, and a contention free period (CFP).

To define a new superframe or application frame, a peer needs to send a channel allocation request on CCDCH or DCDCH and wait for a response from peers within proximity. The first beacon defining a superframe also defines an application frame. Under the different control schemes, this first beacon is called different names and is sent by different parties. For example, in virtually centralized control, is called a Super Beacon and is sent by a SuperVL. In hybrid control schemes, it is a Common Application Beacon sent from a VL, and in distributed control schemes it is a Common Application Beacon from a peer.

Figure 4:
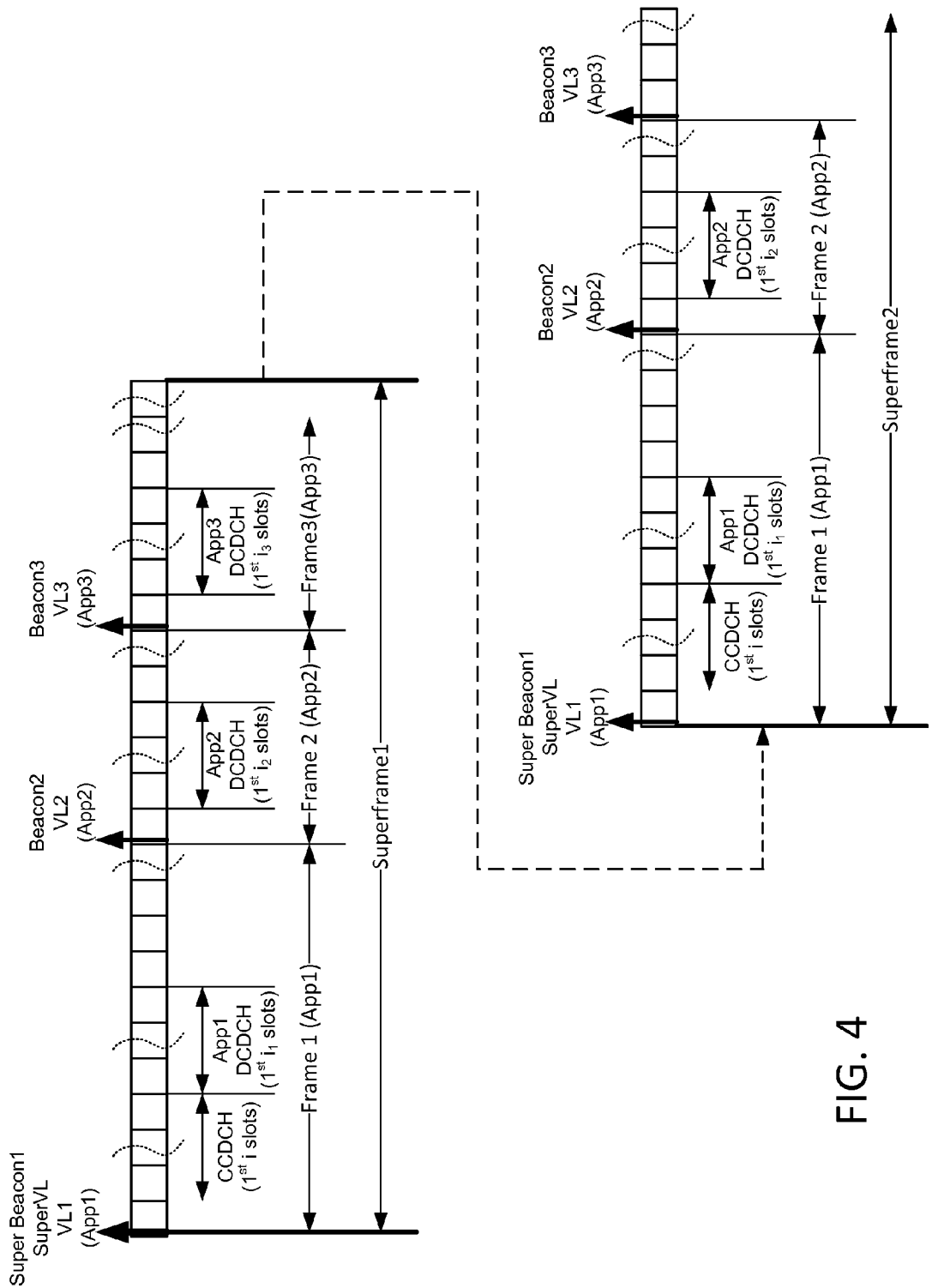
FIG. 4 depicts a general Time Division Multiple Access (TDMA) superframe structure.

FIG. 4 shows a general Time Division Multiple Access (TDMA) superframe structure that may be used for the virtually centralized control scheme illustrated in FIG. 2. With reference to FIGS. 2 and 4, in this example, the Super Beacon defines a superframe, and also functions as the Application Beacon for App1 due to the dual functions—SuperVL and the VL of App1. The DCDCH of App 1 immediately follows the CCDCH. It can be seen that the App1 frame includes the CCDCH, because the VL of this application frame is also the SuperVL for the superframe, while other application frames (e.g., the application frames for App2 and App3) start with an individual Application Beacon and its DCDCH afterward.

Existing TDMA superframe structures, like the superframe structure illustrated in FIG. 4, could benefit from better support for multiple P2P applications, including a more consistent application frame structure. Also, existing superframe structures for Orthogonal Frequency-Division Multiplexing at the physical layer and Direct-Sequence Spread Spectrum at the physical layer, as defined in IEEE standards, could also benefit from better support for P2P applications, particularly multiple P2P applications. Additionally, existing superframe structures do not address the co-existence of the different controls schemes illustrated in FIGS. 1-3.

Enhanced General Superframe Structure

According to one aspect of the present application, an enhanced general superframe structure is disclosed, along with multiple embodiments for different multiple accessing schemes.

Figure 5:
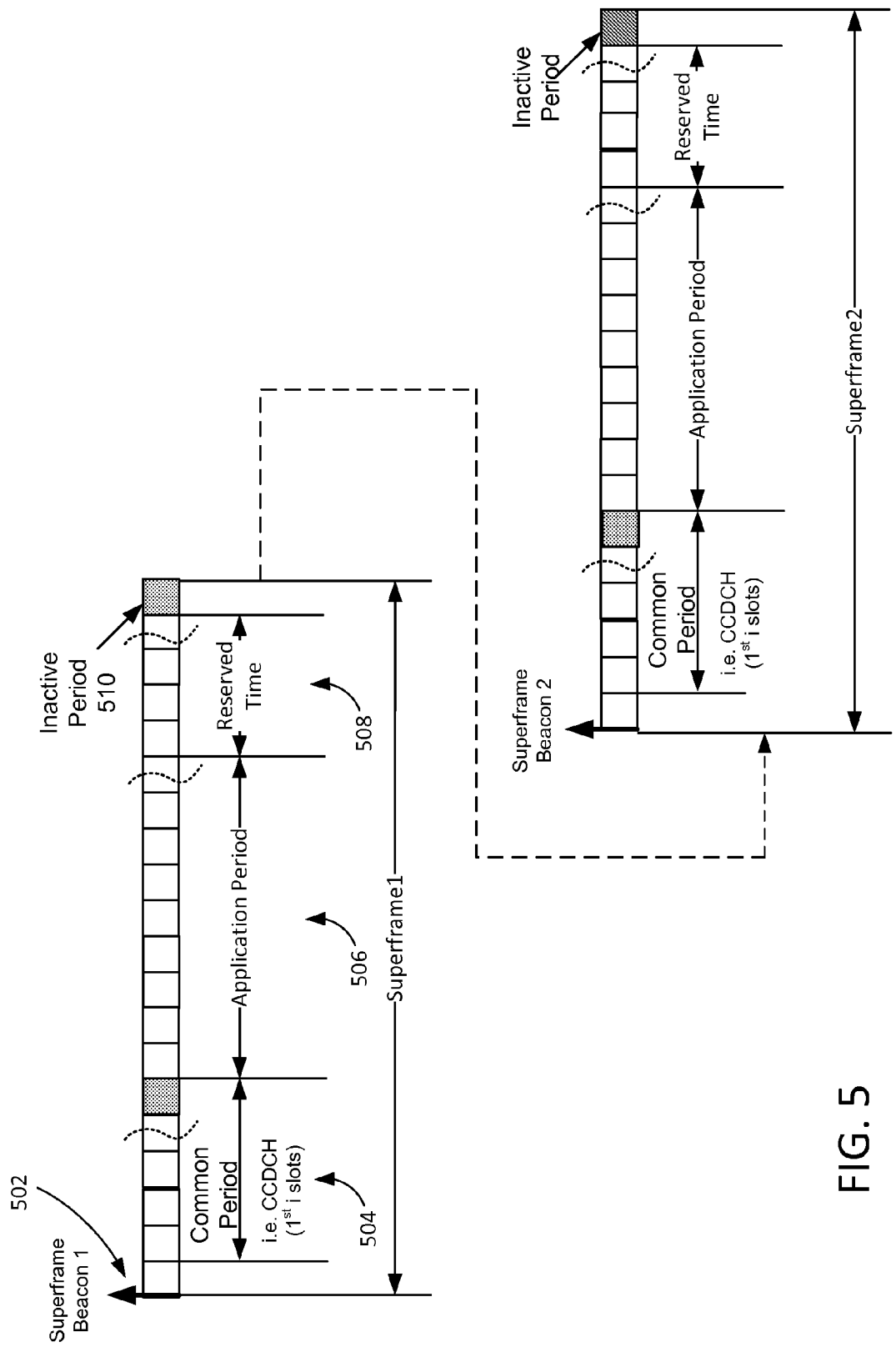
FIG. 5 illustrates an enhanced general superframe structure, in accordance with one embodiment.

One embodiment of an enhanced superframe structure is illustrated in FIG. 5. In the example illustrated in FIG. 5, two successive superframes, Superframe 1 and Superframe 2, are shown. With reference to Superframe 1, each superframe may contain one or more, up to all, of a Superframe Beacon 502, a contention based Common Period 504, such as a CCDCH, an Application Period 506, Reserved Time 508, and an Inactive Period 510.

The Superframe Beacon 502 indicates the start of the superframe. It may be maintained by a SuperVL as a Super Beacon, by a VL as a Common Beacon, or by a peer as a Common Peer Beacon with different control schemes.

The Common Period (CCDCH) 504 may be shared by all the peers in proximity for control or management messages, as well as short or higher priority data. Both public broadcasting/multicasting and private pair communications may be conducted on the CCDCH as contention-based communications. In particular, for "To Be Discovered" and/or "Association Request" messages, the same message (or Discovery Beacon for "To Be Discovered") can be repeated during this period.

The Application Period 506 may be dedicated to P2P application use. In one embodiment, there may be one or multiple application frames (not shown) within the Application Period 506. Different multiple accessing schemes may define different arrangements of the application frames within this time interval. Similar to the Common Period (CCDCH), for "To Be Discovered" and/or "Association Request" messages, the same message (or Discovery Beacon for "To Be Discovered") can be repeated during this period.

The Reserved Time 508 may be reserved for the insertion of other service frames, and the Inactive Period 510 may be an optional gap or guard time between superframes (e.g., between Superframe 1 and Superframe 2 in FIG. 5).

Enhanced TDMA Superframe Structure

Figure 6:
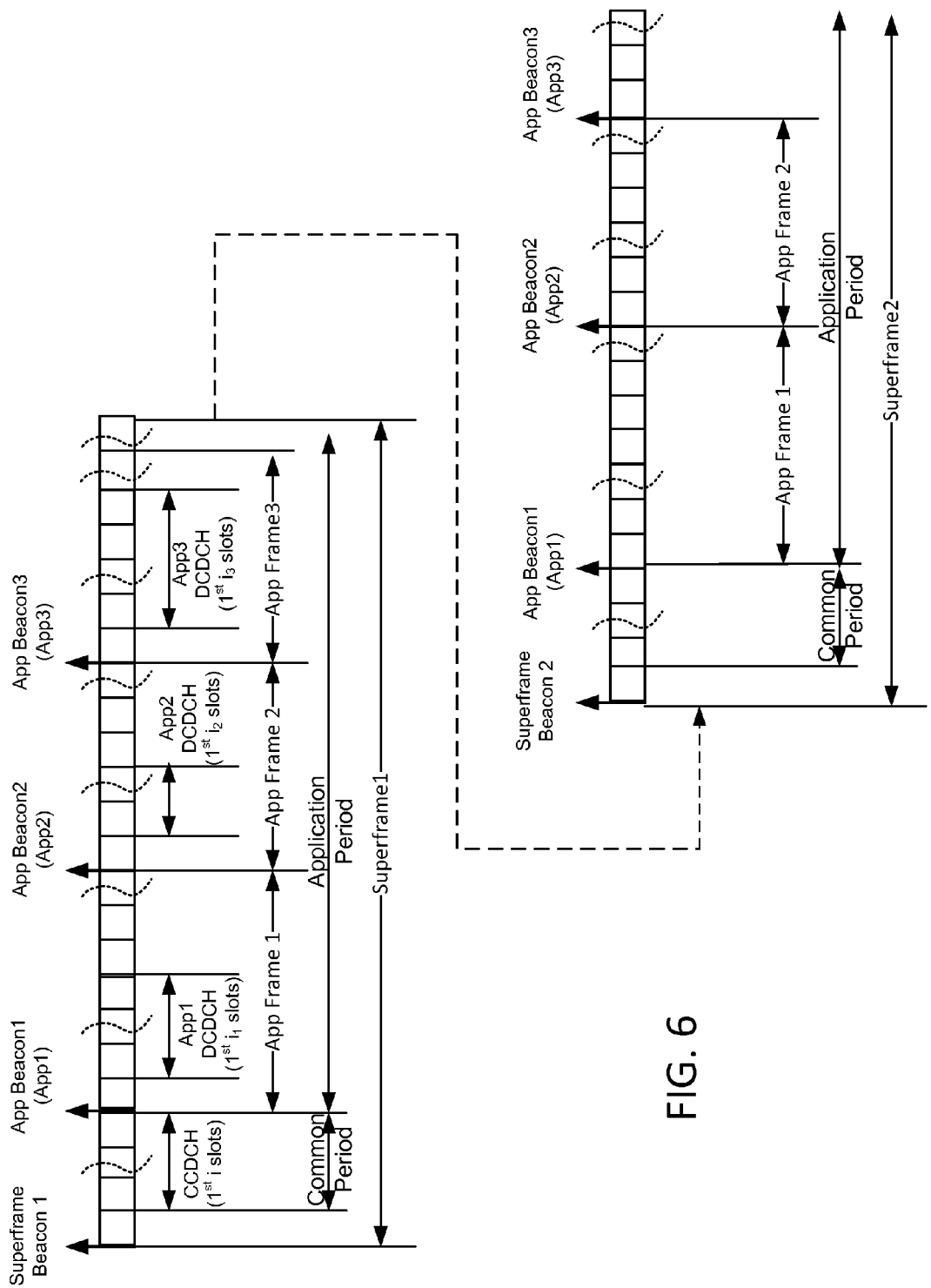
FIG. 6 illustrates one embodiment of the general superframe structure of FIG. 5 for use in TDMA schemes.

FIG. 6 illustrates one embodiment of the general superframe structure of FIG. 5 for use in TDMA schemes. As compared to the TDMA superframe structure of FIG. 4, the superframe structure of FIG. 6 improves upon the former by splitting the function of the super beacon (e.g., Super Beacon 1 of FIG. 4) into a separate Superframe Beacon (e.g., Superframe Beacon 1) and one or more separate Application Beacon(s) (such as App Beacon 1, App Beacon 2, and App Beacon 3), where the Superframe Beacon defines the start of a superframe and each Application Beacon defines the start of a respective application frame. In various embodiments, the Superframe Beacon may be a Super Beacon under a virtually centralized control scheme, a Common Beacon under a hybrid control scheme, or a Common Peer Beacon under a distributed control scheme. As shown, in this embodiment, the CCDCH in the new superframe structure is no longer part of the first application frame (as in the case of the superframe structure of FIG. 4). In other words, the new superframe structure has a common period, including a Superframe Beacon and CCDCH, and the application period includes one or more application frames. Each application frame may be dedicated for one application and starts with an Application Beacon followed by its DCDCH. Hence, the new superframe structure is more consistent with the application frame structure.

Note that the superframe structure illustrated in FIG. 6 is general for all three control schemes. The Superframe Beacon (e.g., Superframe Beacon 1, Superframe Beacon 2, etc.) and the Application Beacons (e.g., App Beacon 1, App Beacon 2, and App Beacon 3) could be maintained by a SuperVL, a VL or a peer depending on the control scheme.

For example, in a virtually centralized control scheme, either the SuperVL or the first VL in proximity may send the Superframe Beacon; the VL may send the Application Beacon. In the case of hybrid control, a VL sends the Superframe Beacon as well as the Application Beacon(s). In a distributed control scheme, any peer may send the Superframe Beacon and Application Beacon(s).

Enhanced OFDM Superframe Structure

Figure 7A:
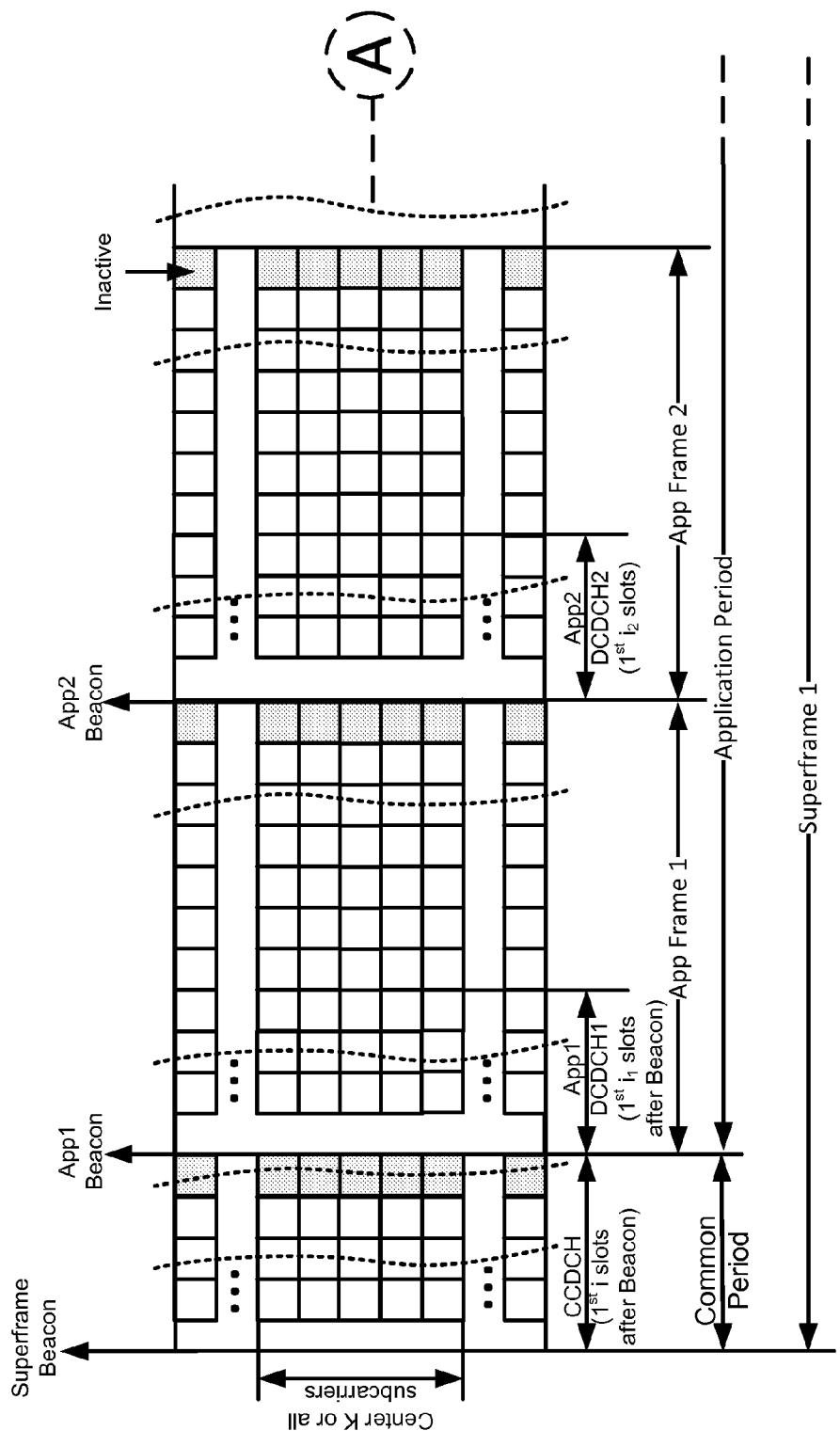
FIGS. 7A and 7B illustrate one embodiment of the general superframe structure of FIG. 5 for use in Orthogonal Frequency-Division Multiplexing (OFDM) schemes.
Figure 7B:
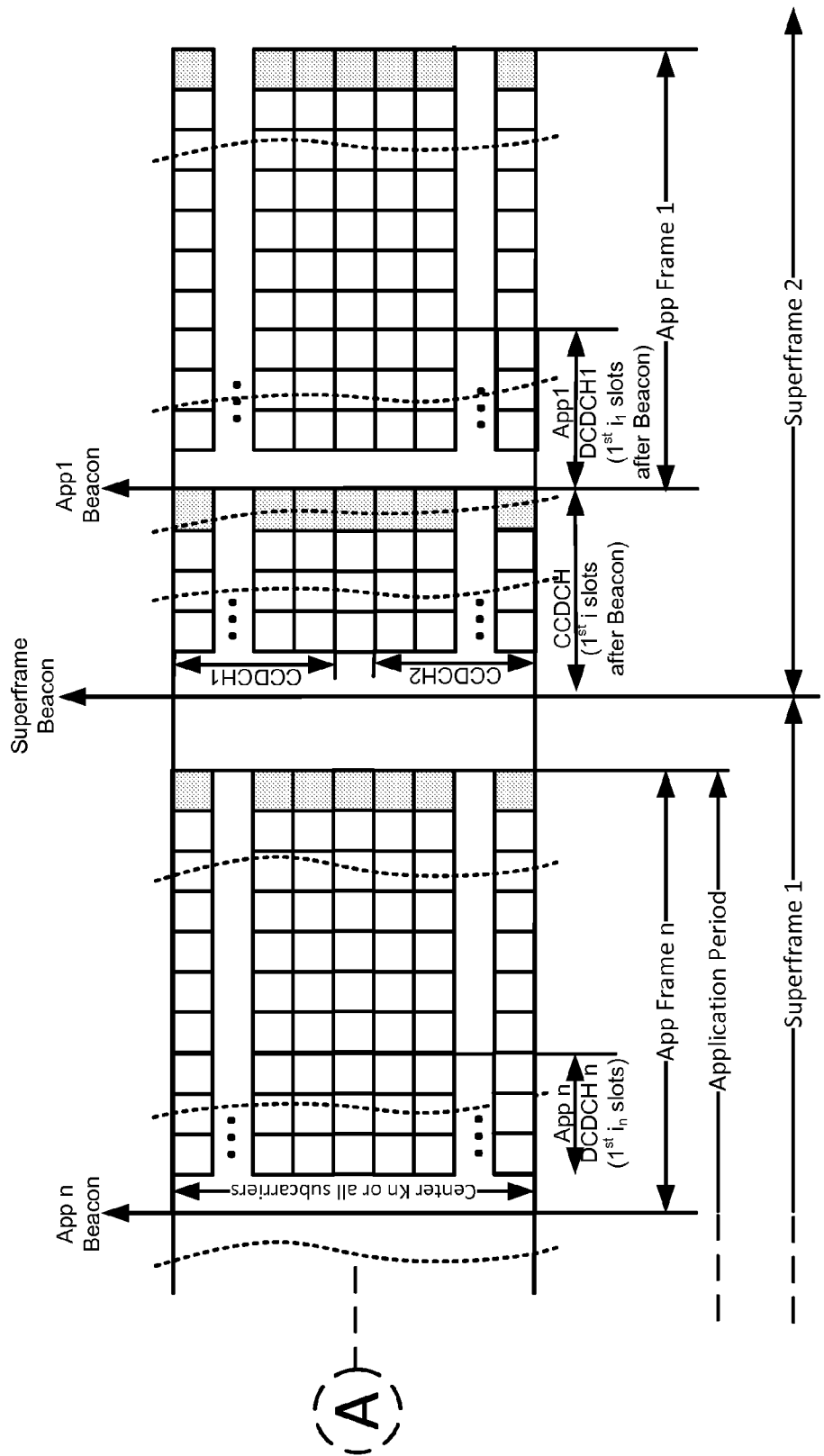

FIGS. 7A and 7B illustrate one embodiment of the general superframe structure of FIG. 5 for use in OFDM schemes. As illustrated, dedicated application frames are assigned at different time intervals (as in TDMA) for contention free accessing. As further shown, the CCDCH and DCDCH may be a subset or all of the subcarriers within the operation band. Also, either the CCDCH or DCDCH may be split to multiple channels. For example, in Superframe 2 (FIG. 7B), the CCDCH is split into two (CCDCH1 and CCDCH2).

Enhanced DSSS Superframe Structure

Figure 8A:
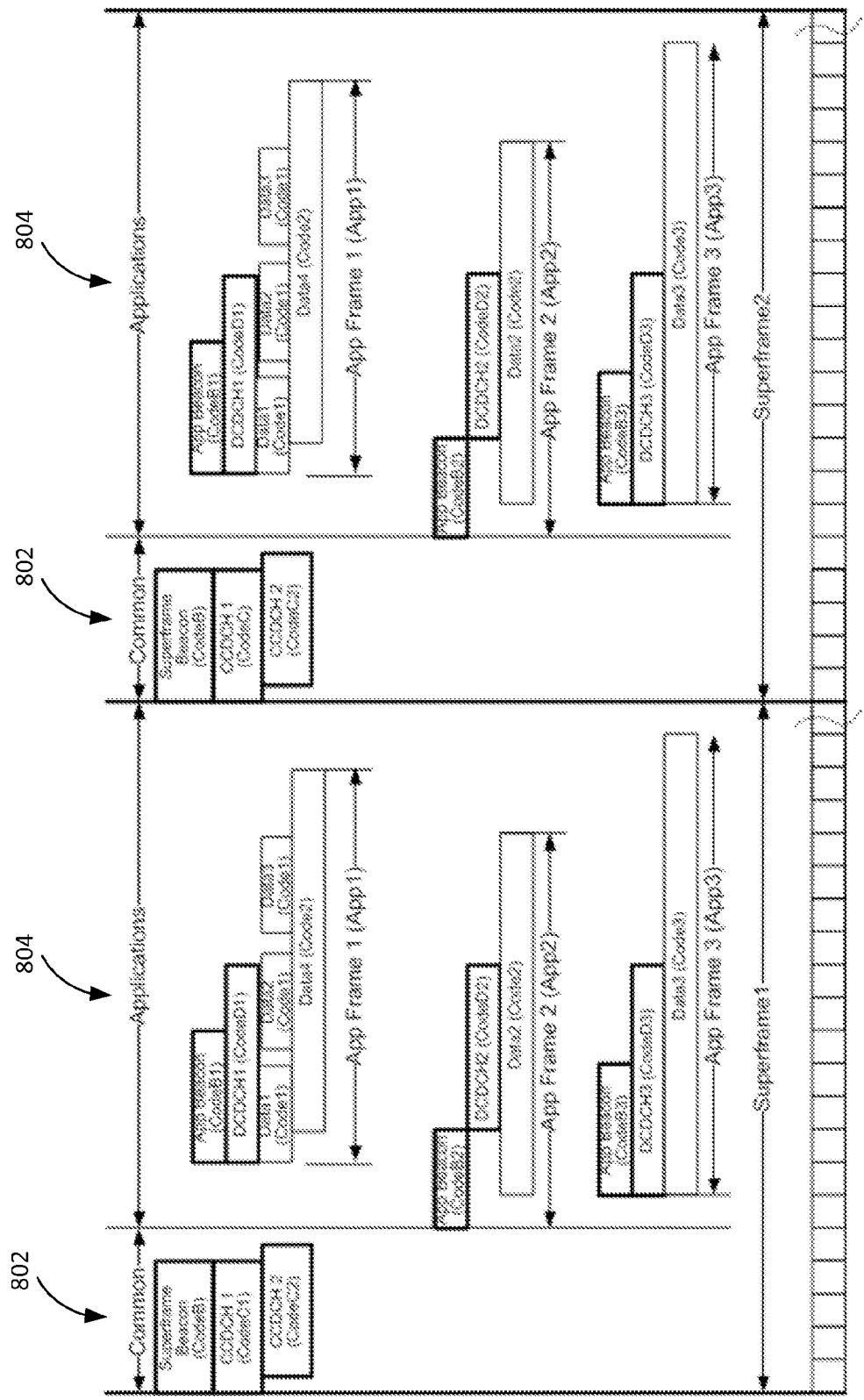
FIGS. 8A and 8B illustrate one embodiment of the general superframe structure of FIG. 5 for use in Direct-Sequence Spread Spectrum (DSSS) schemes.
Figure 8B:
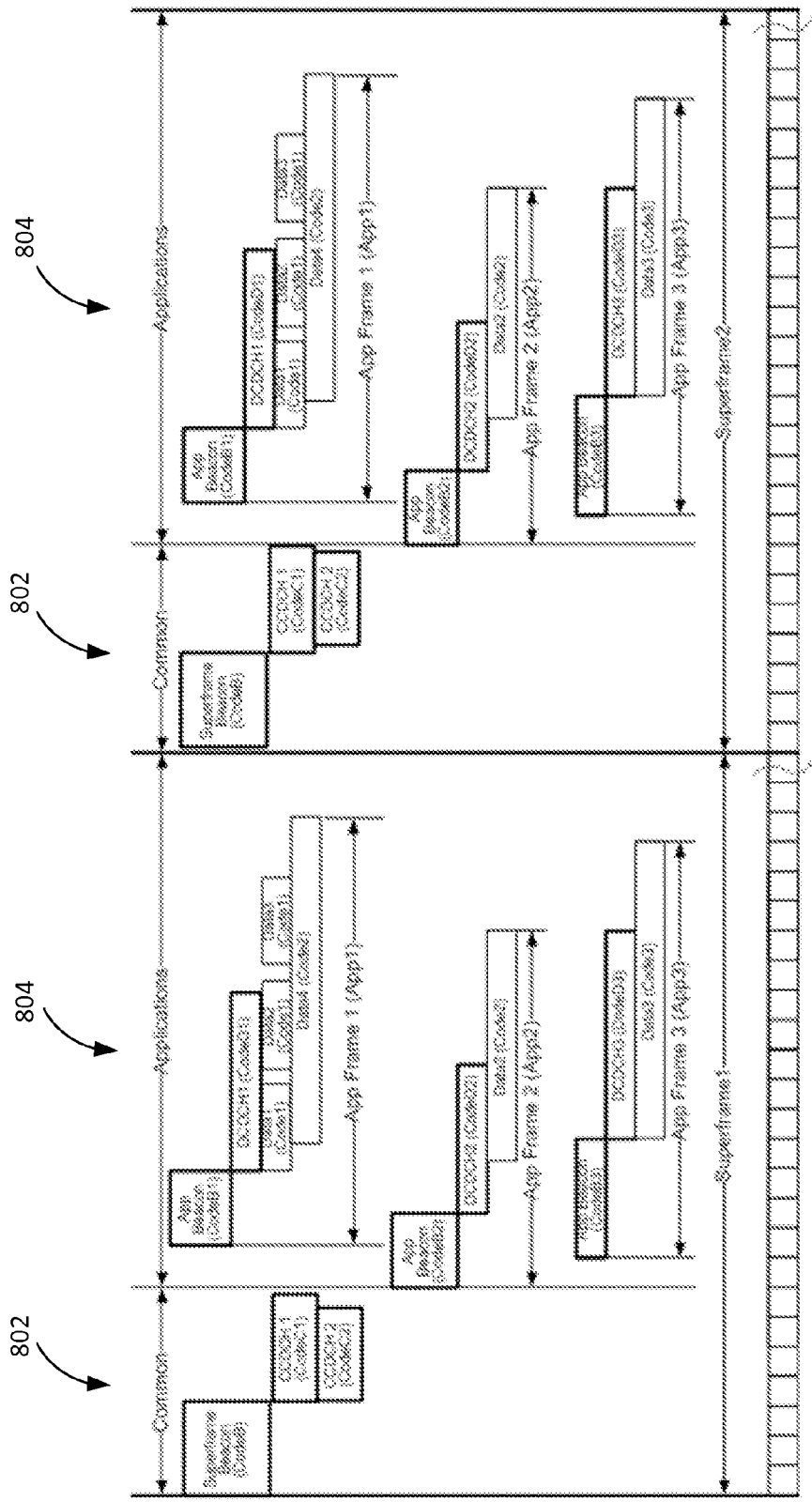

FIGS. 8A and 8B illustrate one embodiment of the general superframe structure of FIG. 5 for use in DSSS schemes. As illustrated, only the Superframe Beacon and CCDCH(s) are allocated within the Common Period to minimize the interference to the Common Period (i.e., CCDCH). In the Application Period, the application frames may be spread with different orthogonal codes and therefore may be overlapped in this time interval. FIG. 8A illustrates an overlapping with the beacon. FIG. 8B illustrates no-overlapping with the beacon.

As illustrated in FIG. 8B, to minimize the interference to the Beacons, CCDCH(s) may start after the Superframe Beacon, and DCDCH(s) and/or data may start after the Application Beacon.

As illustrated in FIGS. 8A and 8B, multiple CCDCHs or DCDCHs may be defined with different orthogonal codes, as shown, for example, with CCDCH1 and CCDCH2. Also, different data packages among peers within a distributed group communication may be spread with different orthogonal codes and therefore may be overlapped in time, as illustrated in application frame App Frame 1 in FIGS. 8A and 8B.

Methods for Co-Existence of Different Control Schemes

Described hereinafter are methods for enabling multiple P2PNWs operating under different control schemes—virtually centralized, distributed, and hybrid control—to co-exist in proximity. In a first scenario addressed herein, there are multiple P2PNWs, some of which use distributed control and others employ virtually centralized control. In a second scenario involving multiple P2PNWs, some of them use virtually centralized control and others employ hybrid control. In a third scenario, some of the multiple P2PNWs use distributed control and others employ hybrid control. Lastly, in a fourth scenario, there are multiple P2PNWs which use distributed control, virtually centralized control and hybrid control simultaneously.

Methods for Co-Existence of Distributed Control and Centralized Control

Figure 9:
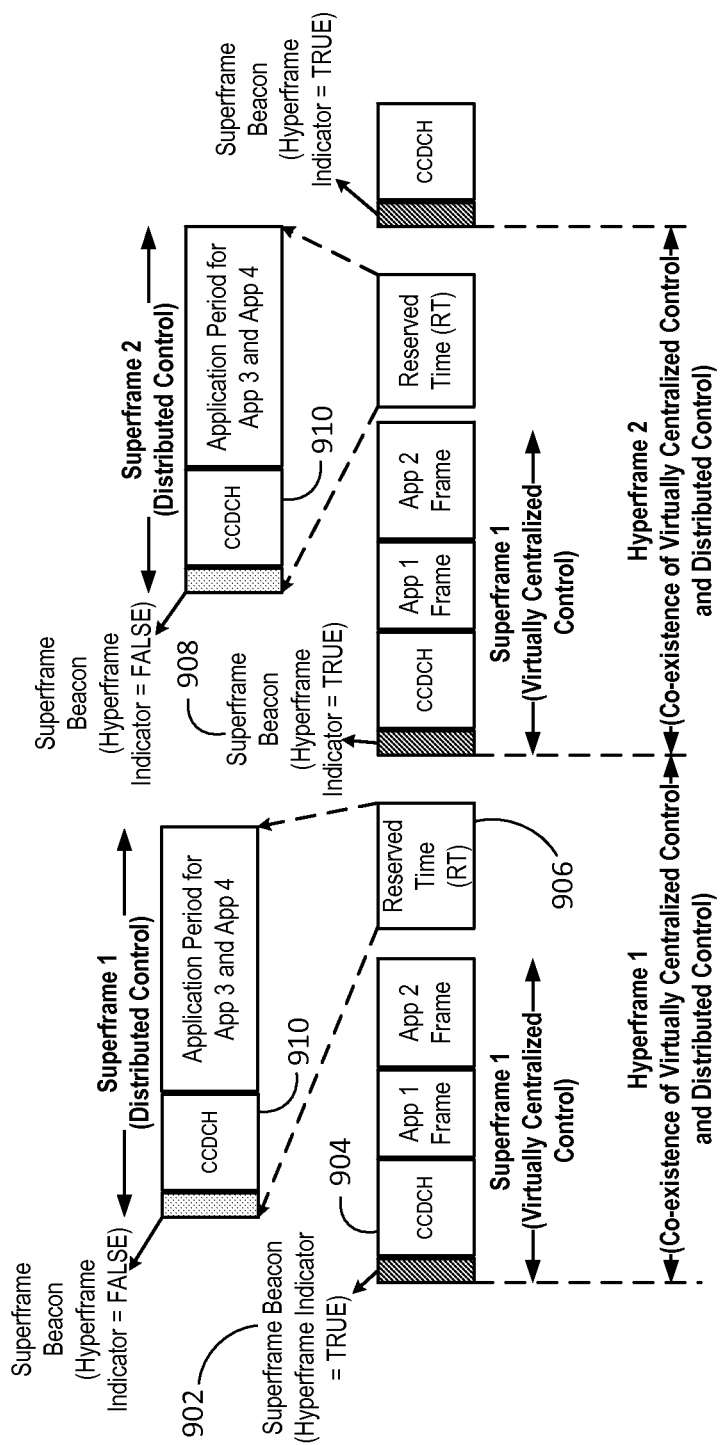
FIG. 9 illustrates a first embodiment of a method for the co-existence of distributed control and virtually centralized control.
Figure 10A:
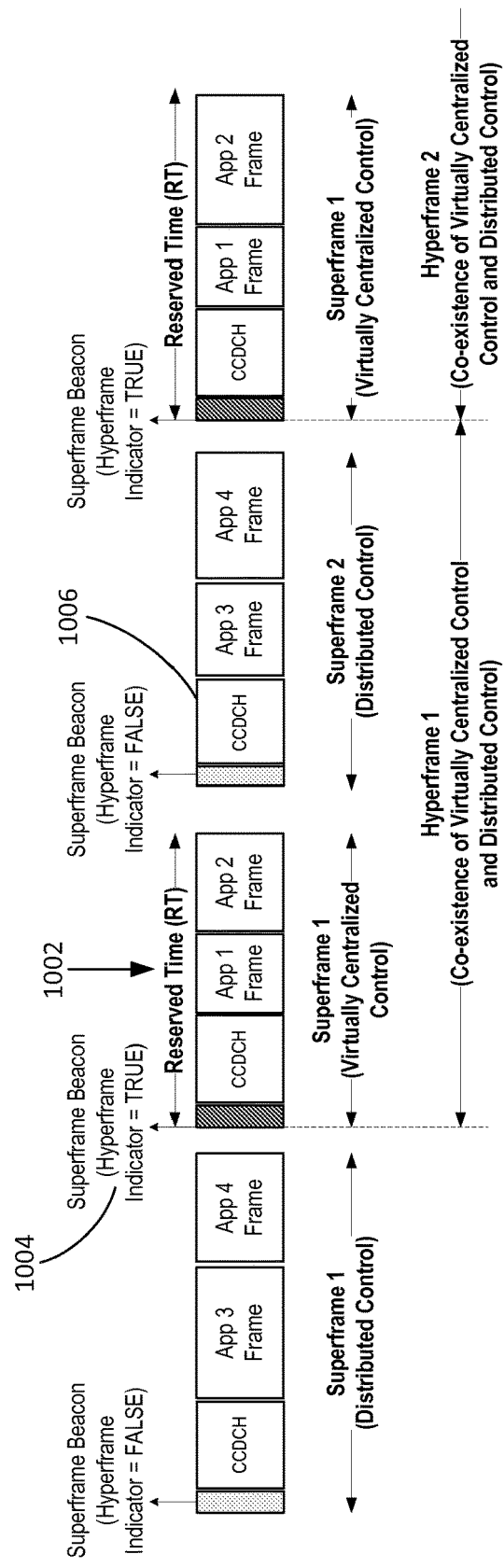
FIGS. 10A and 10B illustrate a second embodiment of a method for the co-existence of distributed control and virtually centralized control.
Figure 10B:
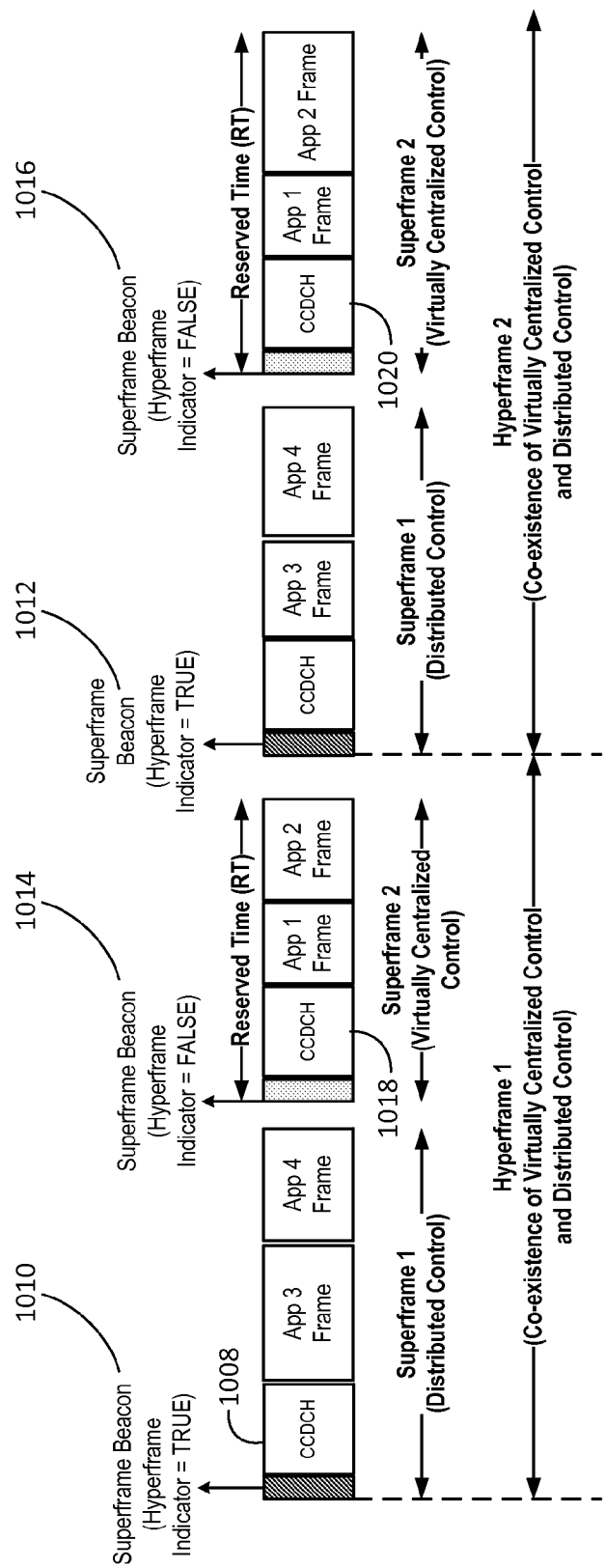

Described in connection with FIGS. 9 and 10A-B is a method for enabling P2PNWs under distributed control to co-exist with P2PNWs in proximity under virtually centralized control. For purposes of discussion only, consider an exemplary system in which there are four P2PNWs in proximity, each of which implements a different P2P application (i.e. App 1 for P2PNW 1, App 2 for P2PNW 2, App 3 for P2PNW 3, and App 4 for P2PNW 4). Assume further that App 1 and App 2 use virtually centralized control, while App 3 and App 4 use distributed control, as those control schemes are described above in connection with FIGS. 1-3.

FIG. 9 illustrates a first embodiment of a method for the co-existence of distributed control and virtually centralized control. In this embodiment, assume that the App 1 and App 2 P2PNWs come into existence first, followed at a later time by the App 3 and App 4 P2PNWs.

In accordance with this first embodiment, the first peer initiating a P2PNW under distributed control (i.e. from App 3 and App 4 P2PNWs) needs to perform the following additional operations. First, the peer scans for the Superframe Beacon of the superframe for virtually centralized control, i.e. the Super Beacon 902. Once detected, the peer may decode the Superframe Beacon to locate the position of the CCDCH 904 of the virtually centralized control superframe. Note that the peer may also decode the Superframe Beacon to locate the Reserved Time 906 allocated by the SuperVL for use by peers under distributed control. Second, the peer under distributed control (i.e., from App 3 and App 4) indicates the occurrence of distributed control for the peers to join its P2PNW and requests channels (i.e. the length of Reserved Time) for that distributed control through the CCDCH 904 of the virtually centralized control superframe. In other words, the first peer of each App 3 and App 4 sends the request message over the CCDCH 906 of the superframe used for the virtually centralized control. This message may contain the following information: (i) an application identifier (i.e., an identifier of the P2P application provided by the peer's P2PNW) and/or category (i.e., an indication of a category of the P2PNW's application, such as social networking, emergency services, gaming, or the like); (ii) application attributes such as an indication of the number of active peers in this application's P2PNW, an indication of whether the distributed control will be frame-based or non-frame-based, and an indication of whether the distributed control will be contention-based or non-contention-based, and (iii) a specification of the channel resources requested by the peer, including for example, an indication of the number of time slots requested, an indication of the number of sub-carriers requested, an indication of the number of resource blocks requested, or the like.

Further in accordance with this first embodiment, the SuperVL for the peers of App1 and App2 under virtually centralized control allocates the certain Reserved Time 906 in the superframe for use by the peers of App 3 and App 4 under distributed control. More specifically, based on the indication and channel requests received over the CCDCH of the superframe for the virtually centralized control of the peers of App1 and App 2, the SuperVL calculates and allocates the RT 906 dedicated to distributed control for the peers of App 3 and App4.

Different methods may be leveraged by the SuperVL to calculate and allocate the RT 906. Generally, using the request from the peers of App3 and App4 as input, the SuperVL will allocate the RT 906 based on different criteria. In one example, if the RT is long enough to satisfy both App3 and App4, the SuperVL will allocate the RT to both as they requested. In another example, if the RT is too short to serve both App3 and App4 but could satisfy one of them, SuperVL may first allocate enough resources from the RT to meet App3 (or App4) requirements and leave the remaining RT for App4 (or App3). In another example, if the RT is too short to serve either App3 or App4, the SuperVL may allocate the RT equally to App3 or App4. In one more example, the SuperVL may allocate more RT resource to App3 (or App4) if App3 (or App4) has more peers, i.e., proportional RT allocation based on the number of peers in the App3 and App4 P2PNWs.

The allocation results (e.g., the start time of RT, the end time of RT, or the duration of RT, etc.) may be contained in the next Superframe Beacon (e.g., Superframe Beacon 908) and broadcasted to all peers under virtually centralized control and distributed control. Optionally, the allocated results can also be immediately sent back to the requesting peers under distributed control via the CCDCH of the superframe for the virtually centralized control.

Other peers under virtually centralized control may follow normal operations for the virtually centralized control scheme.

Further in accordance with this first embodiment, the CCDCH for the peers under distributed control (i.e., the peers of the App3 and App4 P2PNWS) can be created in one of two different places. In one embodiment, the CCDCH for the peers under distributed control may be located at the beginning of the RT allocated by the SuperVL, as illustrated in FIG. 9 at 910. In another embodiment, the CCDCH for the peers under distributed control may co-exist with the CCDCH for the peers under virtually centralized control. In this other embodiment, the CCDCH for distributed control can be placed immediately after the CCDCH for virtually centralized control. Note that this alternate embodiment is not illustrated in FIG. 9.

In accordance with a further aspect of this first embodiment of the method for co-existence of virtually centralized control and distributed control, as further shown in FIG. 9, the concept of a hyperframe may be introduced to facilitate the co-existence of virtually centralized control superframes and distributed control superframe. In accordance with one embodiment, a hyperframe consists of one superframe for virtually centralized control and one superframe for distributed control. As shown in FIG. 9, the superframe for distributed control resides in the RT field of the superframe for virtually centralized control.

Further in accordance with this embodiment, the hyperframe may be defined by a Superframe Beacon having a Hyperframe Indicator which may be set, in one embodiment, to TRUE to indicate that it delineates the start of the hyperframe. In this embodiment, the SuperVL of peers under virtualized centralized control sets the Hyperframe Indicator in the Superframe Beacon to TRUE and in turn defines the hyperframe. In another embodiment (not shown), the peers under distributed control (e.g., the peers of App 3 and App 4 in the present example) may also configure the Hyperframe Indicator to TRUE in their Superframe Beacons based on the negotiation with the SuperVL. In such case, the Superframe Beacon of the peers under distributed control defines the hyperframe.

Also in accordance with the present embodiment, the RT is allocated by the SuperVL to App 3 and App 4 under distributed control. But App 3 and App 4 by themselves may use existing distributed control procedures to request and negotiate channel resources within the RT.

Note also that App 3 and App 4 may come into existence in proximity simultaneously or sequentially. For the latter, i.e. App 4 comes into existence after App 3, App 4 can request channel resources via the CCDCH of the virtually centralized control superframe or the CCDCH of the distributed control superframe.

FIGS. 10A and 10B illustrate a second embodiment of a method for the co-existence of distributed control and virtually centralized control. In this second embodiment, assume that the App 3 and App 4 P2PNWs (under distributed control) come into existence first, followed at a later time by the App 1 and App 2 P2PNWs.

In accordance with this second embodiment, first the SuperVL of the App1 and App2 P2PNWs under virtually centralized control needs to find reserved time (RT) to start its superframe. Also in accordance with this second embodiment, there are two alternatives for the SuperVL to perform this step.

With reference to FIG. 10A, in the first alternative, the SuperVL scans the channel to find sufficient RT. Then, if the RT is long enough (e.g., RT 1002), it inserts a Superframe Beacon to announce itself and start a virtually centralized control superframe (e.g., Superframe 1 of Hyperframe 1). In this case, the SuperVL will configure the Hyperframe Indicator 1004 to TRUE in its Superframe Beacon, which in turn defines the hyperframe (e.g., Hyperframe 1), as illustrated in FIG. 10A. Then, the SuperVL indicates its existence over the CCDCH 1006 of the distributed control superframe.

With reference to FIG. 10B, in the second alternative, if there is not enough RT found, the SuperVL can announce itself and request channels via the CCDCH 1008 of the peers under distributed control. In this way, App 3 and App 4 are able to know of the existence of App 1 and App 2 with virtually centralized control. Then, after the peer(s) under distributed control receives the request from the SuperVL, it/they respond and grant the channel resources to the SuperVL via the CCDCH 1008 of the distributed control superframe. For example, the peer(s) under distributed control may increase the size of RT for App1 and App2 and announce the increase via the CCDCH 1008. Based on the received response—which may indicate the start of the RT resource allocated to App1 and App2 and the size of the allocated RT, or alternatively, the start and end of the allocated RT—the SuperVL defines the superframe for virtually centralized control (e.g., Superframe 2 of Hyperframe 1 in FIG. 10B). In this case, the Superframe Beacon for distributed control (e.g., Superframe Beacon 1010, 1012) contains the Hyperframe Indicator (set to TRUE) and in turn defines the hyperframe.

Further in accordance with this second embodiment of FIGS. 10A and 10B, after the superframe for virtually centralized control is formulated, the peers under distributed control can scan the Superframe Beacon for the virtually centralized control (e.g., Superframe Beacon 1014, 1016) and optionally switch to use the CCDCH for virtually centralized control (e.g., CCDCH 1018, 1020) for distributed control purposes.

As shown in FIGS. 10A and 10B, the concept of a hyperframe may again be introduced to facilitate the co-existence of a virtually centralized control superframe and a distributed control superframe. As shown, the hyperframe may consists of one superframe for distributed control and one superframe for virtually centralized control. In various embodiments, the SuperVL of the App1 and App2 P2PNWs, and the peers of the App 3 and App 4 P2PNWs may negotiate whether the hyperframe should be defined by the Superframe Beacon for virtually centralized control or by the Superframe Beacon for distributed control. Such negotiation may be done via the CCDCH of the virtually centralized control superframe or the CCDCH of the distributed control superframe.

After a hyperframe is formed for the co-existence of the App 1 and App 2 P2PNWs under virtually centralized control and the App 3 and App 4 P2PNWs under distributed control, the peers of these P2PNWs may dynamically request and negotiate channel resources in several different ways.

In a first approach, all peers may use the distributed control procedures to negotiate and request channel resources.

In a second approach, all P2PNWs under virtually centralized control (e.g., App 1 and App 2 P2PNWs) may each be regarded as a special P2PNW. In this approach, the SuperVL negotiates and requests channel resources via the CCDCH of the distributed control superframe(s) with other distributed control networks on behalf of its special P2PNW using distributed control procedures. Then, the SuperVL can re-allocate the requested resources among the P2PNWs under virtually centralized control using virtually centralized control procedures.

In a third approach, the P2PNWs under distributed control (e.g., App 3 and App 4 P2PNWs) negotiate and request channel resources with the SuperVL via the CCDCH of the virtually centralized control superframe(s). As a result, the period of time allocated by the SuperVL can be adjusted. Then, the P2PNWs under distributed control can re-negotiate and re-distribute the allocated time.

Methods for Co-Existence of Virtually Centralized Control and Hybrid Control

The same methods developed for the co-existence of virtually centralized control and distributed control may be applied in a scenario involving both virtually centralized control and hybrid control. That is, the VL under hybrid control may perform the same new operations as discussed in connection with FIGS. 9 and 10A-B for peers under distributed control. And, the SuperVL under virtually centralized control may perform the same new operations as the SuperVL described above in connection with FIGS. 9 and 10A-B.

Methods for Co-Existence of Distributed Control and Hybrid Control

Figure 11:
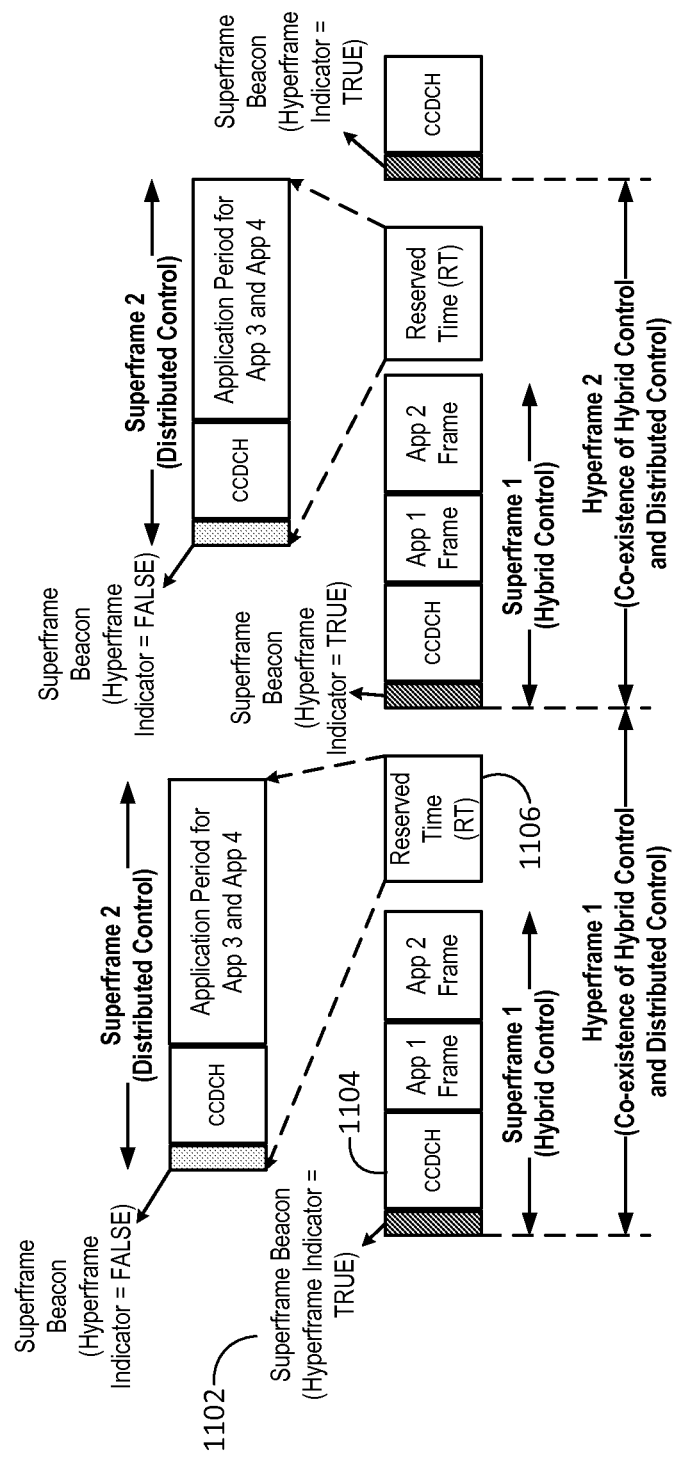
FIG. 11 illustrates a first embodiment of a method for the co-existence of distributed control and virtually centralized control.
Figure 12A:
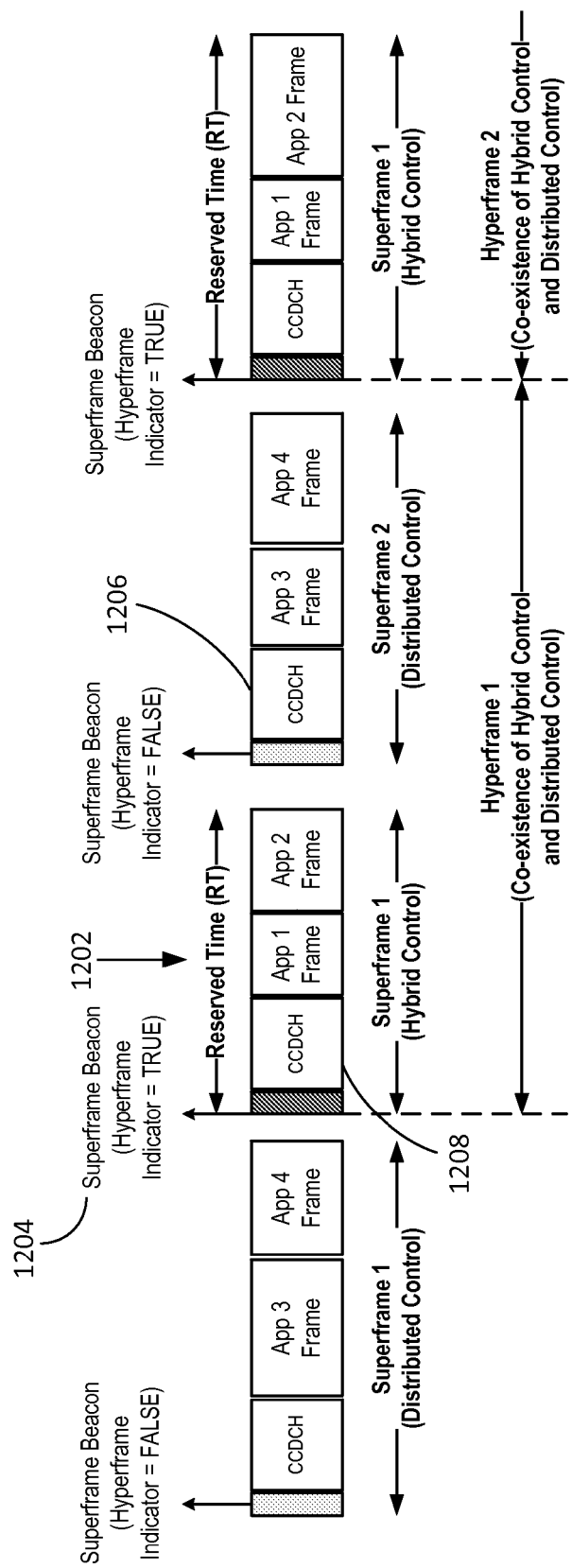
FIGS. 12A and 12B illustrate a second embodiment of a method for the co-existence of distributed control and hybrid control.
Figure 12B:
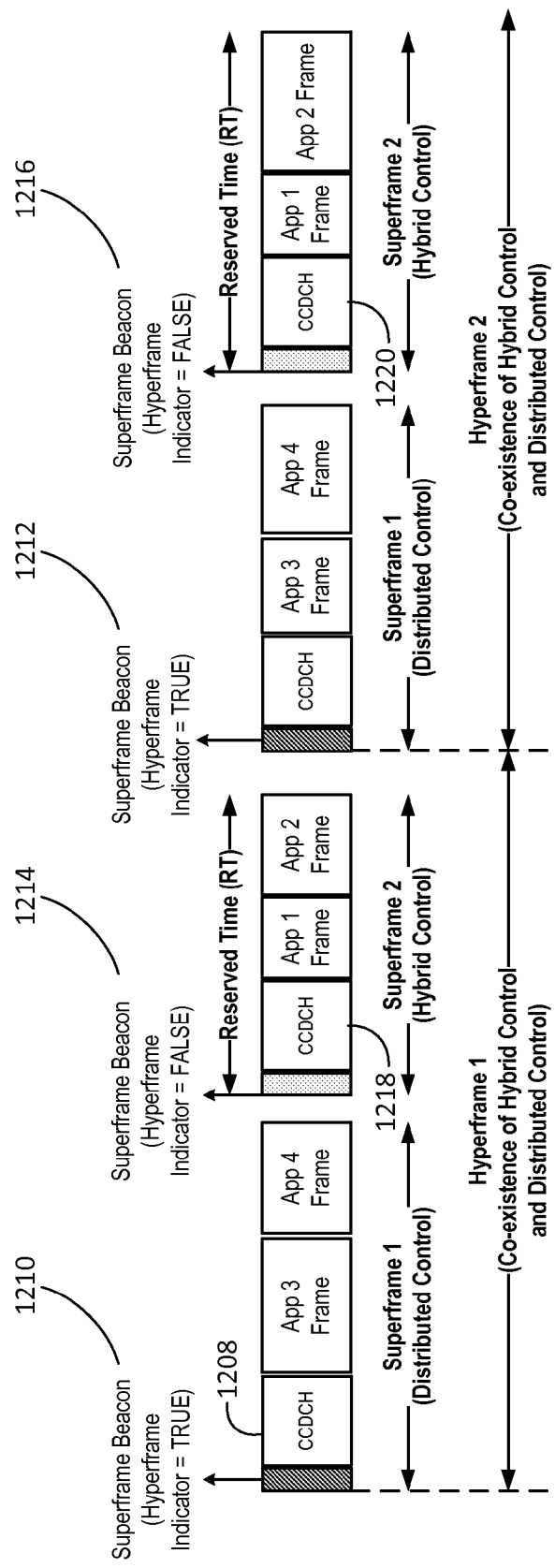

Because inter-P2PNWs control is always distributed under either distributed control or hybrid control, both control schemes can naturally co-exist. In P2PNWs under hybrid control, each P2PNW application has a VL, while there is no VL in P2PNWs under distributed control. Described in connection with FIGS. 11 and 12A-B is a method for enabling P2PNWs under distributed control to co-exist with P2PNWs in proximity under hybrid control. For purposes of discussion only, again consider an exemplary system in which there are four P2PNWs in proximity each implementing its own P2P application (e.g., App 1, App 2, App 3, and App 4). In this example, assume that the App 1 and App 2 P2PNWs use hybrid control, while the App 3 and App 4 P2PNWs use distributed control.

FIG. 11 illustrates a first embodiment of a method for the co-existence of distributed control and hybrid control. In this embodiment, assume that the App 1 and App 2 P2PNWs (under Hybrid Control) come into existence first, followed at a later time by the App 3 and App 4 P2PNWs (under Distributed Control).

In accordance with this first embodiment, the first peers of the App 3 and App 4 P2PNWs under distributed control scans a channel to detect a Superframe Beacon (e.g. Superframe Beacon 1102) of a superframe for hybrid control. Once detected, the peer may decode the Superframe Beacon to locate the position of the CCDCH 1104 of the hybrid control superframe. Next, the peer under distributed control (i.e., from App 3 and App 4) indicates the occurrence of distributed control for the peers to join its P2PNW and requests channels (i.e. the length of Reserved Time) for that distributed control through the CCDCH 1104 of the hybrid control superframe (e.g., Superframe 1 of Hyperframe 1 in FIG. 11). App 1 and App 2 then together decide on the channel resources to be allocated to App 3 and App 4. Those resources are allocated in the form of Reserved Time (RT) (e.g., RT 1106 in FIG. 11). In this embodiment, the request message sent by App 3 and App 4 via the CCDCH 1104 may be similar to the request message described above in connection with the method illustrated in FIG. 9. That is, the message may contain the following information: (i) an application identifier (i.e., an identifier of the P2P application provided by the peer's P2PNW) and/or category (i.e., an indication of a category of the P2PNW's application, such as social networking, emergency services, gaming, or the like); (ii) application attributes such as an indication of the number of active peers in this application's P2PNW, an indication of whether the distributed control will be frame-based or non-frame-based, and an indication of whether the distributed control will be contention-based or non-contention-based, and (iii) a specification of the channel resources requested by the peer, including for example, an indication of the number of time slots requested, an indication of the number of sub-carriers requested, an indication of the number of resource blocks requested, or the like.

Further in accordance with this first embodiment, a hyperframe may be defined by the Superframe Beacon 1102 for hybrid control. In this embodiment, each hyperframe may include one superframe for hybrid control (e.g., Superframe 1 of Hyperframe 1 in FIG. 11) and one superframe for distributed control (e.g., Superframe 2 of Hyperframe 1 in FIG. 11). In an alternative embodiment, the hyperframe could instead be defined by the Superframe Beacon of a distributed control superframe.

Similar to the methods described above in connection with FIGS. 9 and 10A-B, in this embodiment, the peers of the App 1, App 2, App 3, and App 4 P2PNWs together can negotiate whether the hyperframe should be defined by the Superframe Beacon of a hybrid control superframe or by the Superframe Beacon of a distributed control superframe. Such negotiation can be done via the CCDCH of the hybrid control superframe or the CCDCH of the distributed control superframe.

Also, note that in the present embodiment, the App 3 P2PNW and App 4 P2PNW may come into existence in proximity simultaneously or sequentially. For the latter case, and assuming for example that App 4 P2PNW comes into existence after the App 3 P2PNW, the peers of the App 4 P2PNW can request channel resources via the CCDCH of the hybrid control superframe or the CCDCH of the distributed control superframe.

FIGS. 12A and 12B illustrate a second embodiment of a method for the co-existence of distributed control and hybrid control. In this second embodiment, assume that the App 3 and App 4 P2PNWs (under distributed control) come into existence first, followed at a later time by the App 1 and App 2 P2PNWs (under hybrid control).

In accordance with this second embodiment, first the VL of the App1 and App2 P2PNWs under hybrid control needs to find reserved time (RT) to start its superframe. Also in accordance with this second embodiment, there are two alternatives for the VL to perform this step.

With reference to FIG. 12A, in the first alternative, the VL of the App 1 and App 2 P2PNWs scans the channel until RT is found. Then, if the RT is long enough (e.g., RT 1202), the VL inserts a Superframe Beacon (e.g., Superframe Beacon 1204) to start the superframe for hybrid control (e.g., Superframe 1 of Hyperframe 1 in FIG. 12A). This effectively announces the existence of the peer-to-peer network under hybrid control to the peers of the peer-to-peer network under distributed control. The peers of the App 1, App 2, App 3, and App 4 P2PNWs may then negotiate channel resources over the CCDCH of the hybrid control superframe (e.g., CCDCH 1208) or the CCDCH of distributed control superframe (e.g., CCDCH 1206).

With reference to FIG. 12B, in the second alternative, if there is not enough RT found, the VL can announce itself and request channels via the CCDCH 1208 of the peers under distributed control. In this way, App 3 and App 4 are able to know the existence of App 1 and App 2 under hybrid control. Then, after the peer(s) under distributed control receives the request from the VL, it(they) responds and grants the channel resources to the VL via the CCDCH 1208 of the distributed control superframe. Based on the received response, the VL defines the superframe for hybrid control (e.g., Superframe 2 of Hyperframe 1 in FIG. 12B). In this case, the Superframe Beacon for distributed control (e.g., Superframe Beacon 1210, 1212) contains the Hyperframe Indicator (set to TRUE) and in turn defines the hyperframe.

As shown in FIGS. 12A and 12B, the concept of a hyperframe may again be introduced to facilitate the co-existence of a hybrid control superframe and a distributed control superframe. As shown, the hyperframe may consist of one superframe for hybrid control and one superframe for distributed control. In various embodiments, the VL of the App1 and App2 P2PNWs, and the peers of the App 3 and App 4 P2PNWs may negotiate whether the hyperframe should be defined by the Superframe Beacon for hybrid control or by the Superframe Beacon for distributed control. Such negotiation may be done via the CCDCH of the hybrid control superframe or the CCDCH of the distributed control superframe.

Methods for Co-Existence of All Three Control Schemes

Described hereinafter is a method for enabling P2PNWs under all three of the different control schemes—distributed control, virtually centralized control, and hybrid control—to co-exist in proximity. In accordance with this method, a hyperframe may be defined by a Superframe Beacon of a virtually centralized control superframe, a Superframe Beacon of a distributed control superframe, or a Superframe Beacon of a hybrid control superframe. Each hyperframe may consist of: one superframe for virtually centralized control, one superframe for distributed control, and one superframe for hybrid control. For purposes of discussion only, consider an exemplary system in which there are three P2PNWs in proximity, each implementing its own P2P application (e.g., App 1, App 2, and App 3). In this example, assume that App 1 uses virtually centralized control, App 2 uses distributed control, and App 3 uses hybrid control.

In a first embodiment, assume that the App 1 P2PNW (virtually centralized control) comes into existence before the App 2 P2PNW (distributed control) and the App3 P2PNW (hybrid control). In accordance with this embodiment, if the App 2 P2PNW (distributed control) comes into existence prior to the App 3 P2PNW, then the methods described above in connection with FIGS. 9 and 10A-B for co-existence of distributed control and virtually centralized control may be applied when the App 2 P2PNW comes into existence. When the App 3 P2PNW comes into existence later, the method described above for co-existence of virtually centralized control and hybrid control may be employed (if the hyperframe is defined by the Superframe Beacon for the virtually centralized control superframe) or the method for co-existence of distributed control and hybrid control described above and illustrated in FIGS. 11 and 12A-B may be employed (if the hyperframe is defined by the Superframe Beacon of the distributed control superframe).

If instead, the App 3 P2PNW (hybrid control) comes into existence prior to the App 2 P2PNW (distributed control), then the method described above for the co-existence of virtually centralized control and hybrid control may be applied when the App 3 P2PNW comes into existence. When the App 2 P2PNW comes into existence later, the method for co-existence of distributed control and virtually centralized control described above and illustrated in FIGS. 9 and 10A-B may be applied (if the hyperframe is defined by the Superframe Beacon of the virtually centralized control superframe) or the method for co-existence of distributed control and hybrid control described above and illustrated in FIGS. 11 and 12A-B may be applied (if the hyperframe is defined by the Superframe Beacon of the hybrid control superframe).

In a second embodiment, assume that the App 2 P2PNW (distributed control) comes into existence before the App 1 P2PNW (virtually centralized control) and the App3 P2PNW (hybrid control). In accordance with this embodiment, if the App 1 P2PNW comes into existence prior to the App 3 P2PNW, the method for co-existence of distributed control and virtually centralized control described above and illustrated in FIGS. 9 and 10A-B may be applied when the App 1 P2PNW comes into existence. When the App 3 P2PNW comes into existence later, the method for co-existence of virtually centralized control and hybrid control described above may be applied (if the hyperframe is defined by the Superframe Beacon of the virtually centralized control superframe) or the method for co-existence of distributed control and hybrid control described above and illustrated in FIGS. 11 and 12A-B may be applied (if the hyperframe is defined by the Superframe Beacon of the distributed control superframe).

If instead the App 3 P2PNW comes into existence prior to the App 1 P2PNW, the method for co-existence of distributed control and hybrid control described above and illustrated in FIGS. 11 and 12A-B may be applied when App 3 P2PNW comes into existence. When the App 1 P2PNW comes into existence later, the method for co-existence of distributed control and virtually centralized control described above and illustrated in FIGS. 9 and 10A-B may be applied (if the hyperframe is defined by the Superframe Beacon of the distributed control superframe) or the method for co-existence of virtually centralized control and hybrid control described above may be applied (if the hyperframe is defined by the Superframe Beacon of the hybrid control superframe).

In a third embodiment, assume that the App3 P2PNW (hybrid control) comes into existence before the App 1 P2PNW (virtually centralized control) and the App 2 P2PNW (distributed control). In accordance with this embodiment, if the App 1 P2PNW comes into existence prior to the App 2 P2PNW, the method described for co-existence of virtually centralized control and hybrid control may be applied when the App 1 P2PNW comes into existence. When the App 2 P2PNW comes into existence later, the method for co-existence of distributed control and virtually centralized control described above and illustrated in FIGS. 9 and 10A-B may be applied (if the hyperframe is defined by the Superframe Beacon of the virtually centralized control superframe) or the method for co-existence of distributed control and hybrid control described above and illustrated in FIGS. 11 and 12A-12B may be applied (if the hyperframe is defined by the Superframe Beacon of the hybrid control superframe).

If instead the App 2 P2PNW comes into existence prior to the App 1 P2PNW, the method for co-existence of distributed control and hybrid control described above and illustrated in FIGS. 11 and 12A-B may be applied when the App 2 P2PNW comes into existence. When the App 1 P2PNW comes into existence later, the method for co-existence of distributed control and virtually centralized control described above and illustrated in FIGS. 9 and 10A-B may be applied (if the hyperframe is defined by the Superframe Beacon of the distributed control superframe) or the method for co-existence of virtually centralized control and hybrid control described above may be applied (if the hyperframe is defined by the Superframe Beacon of a hybrid control superframe).

After all three P2PNWs (i.e. App 1, App 2, and App 3) join and a hyperframe is formed, they can negotiate to define the next hyperframe by either control scheme, through the first CCDCH in the current hyperframe.

Figure 13:
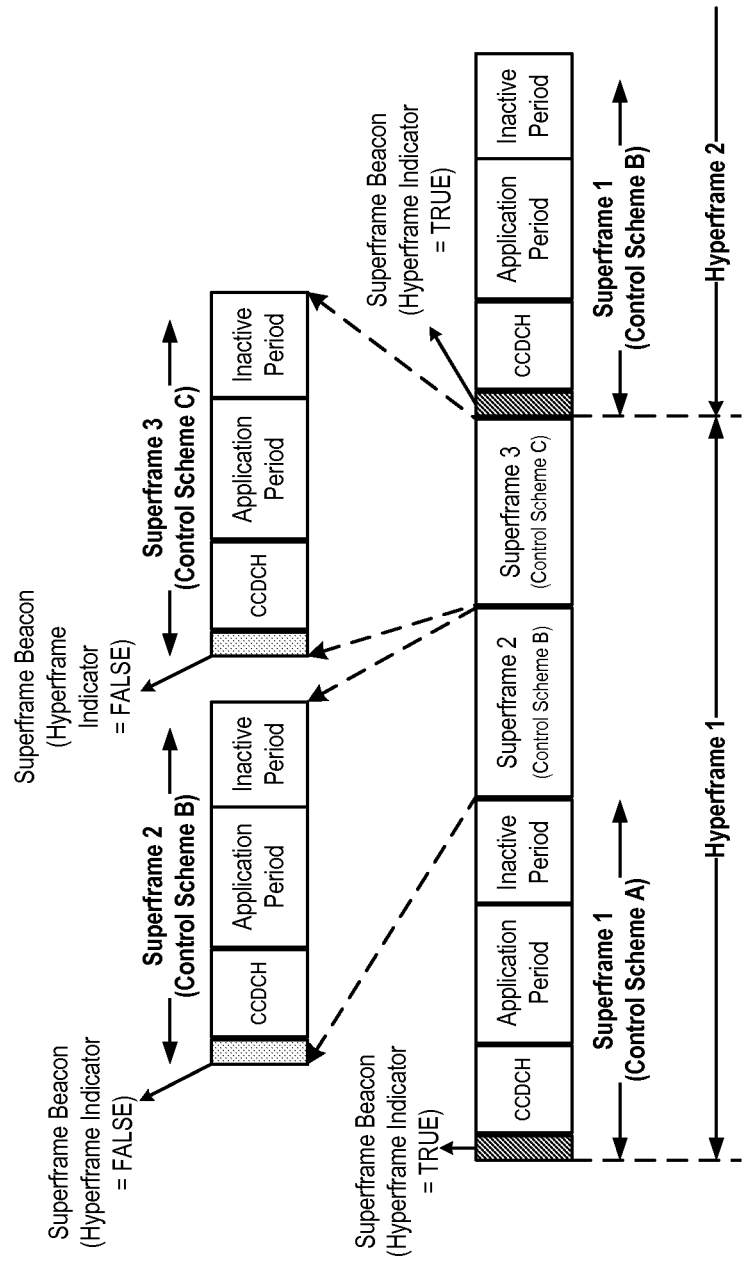
FIG. 13 illustrates one embodiment of a hyperframe structure that may be used to enable the co-existence of virtually centralized, distributed, and hybrid control schemes.

FIG. 13 illustrates a hyperframe structure that may be used to enable the co-existence of the three different control schemes, which may be referenced as control schemes A, B, and C, respectively. As shown, in each hyperframe, each control scheme has a respective superframe.

Example M2M/IoT/WoT Communication System

Figure 14A:
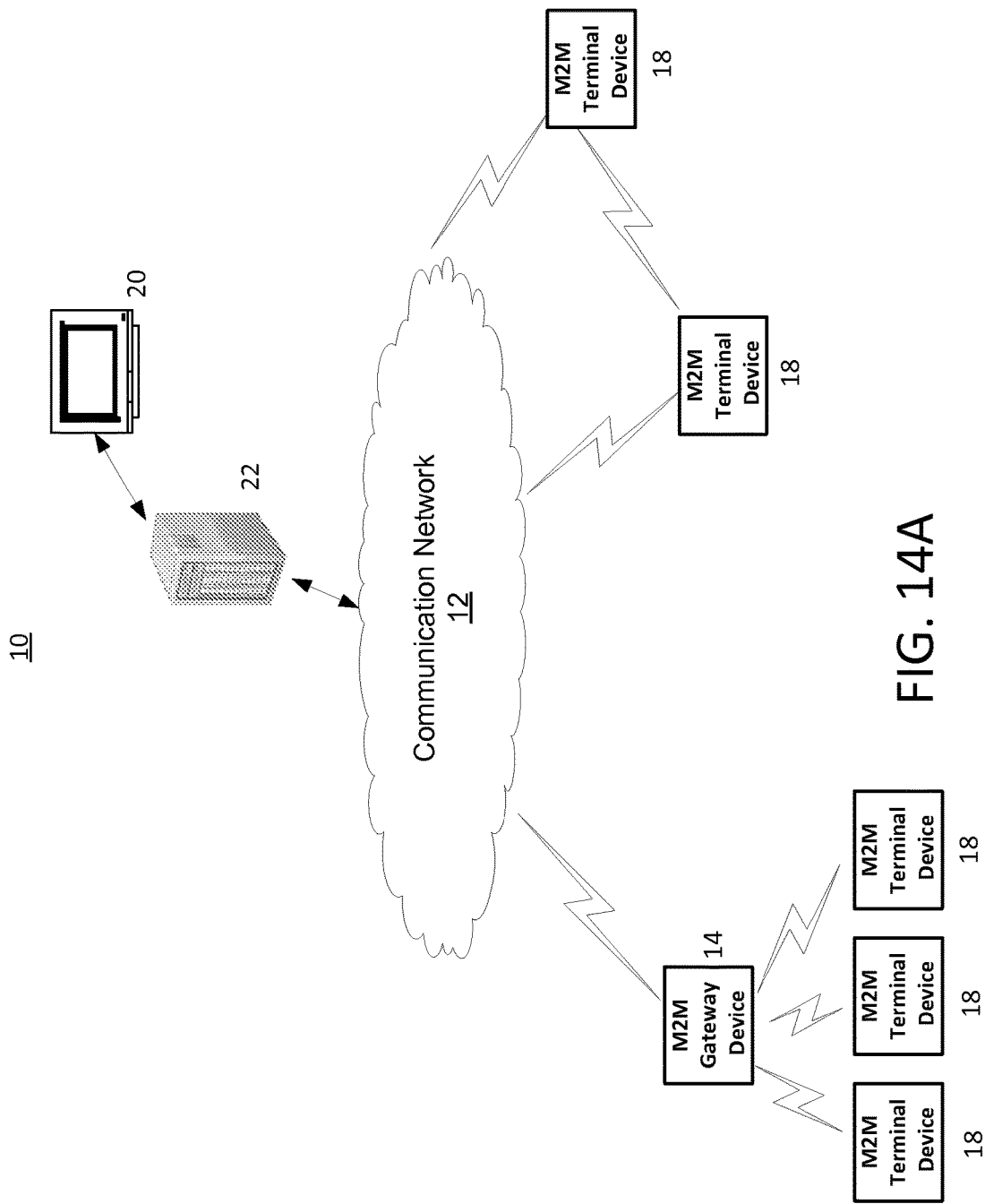
FIG. 14A is a system diagram of an example machine-to-machine (M2M), Internet of Things (IoT), or Web of Things (WoT) communication system in which one or more disclosed embodiments may be implemented.

FIG. 14A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc.

As shown in FIG. 14A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 14A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. These M2M gateway and terminal devices 14, 18 may be peers that participate in one or more peer to peer networks, such as those illustrated for example in FIGS. 1-3, as disclosed above. Such peers may utilize one or more of the frame structures illustrated FIGS. 5, 6, 7A-B, and 8A-B when communicating with other peers as described above. Additionally, such peers may perform the methods described above and illustrated in FIGS. 9, 10A-B, 11, 12A-B, and 13 to enable the co-existence of two or more of the virtually centralized, distributed, and hybrid control schemes in proximity.

It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link in proximity. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 and gateways 14 may collect data and send the data, via the communication network 12 or direct radio link in proximity, to an M2M application 20 or other M2M devices 18 and gateways 14. The M2M devices 18 and gateways 14 may also receive data from the M2M application 20 or another M2M device 18 or gateway 14. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link in proximity, and wireline for example.

Figure 14B:
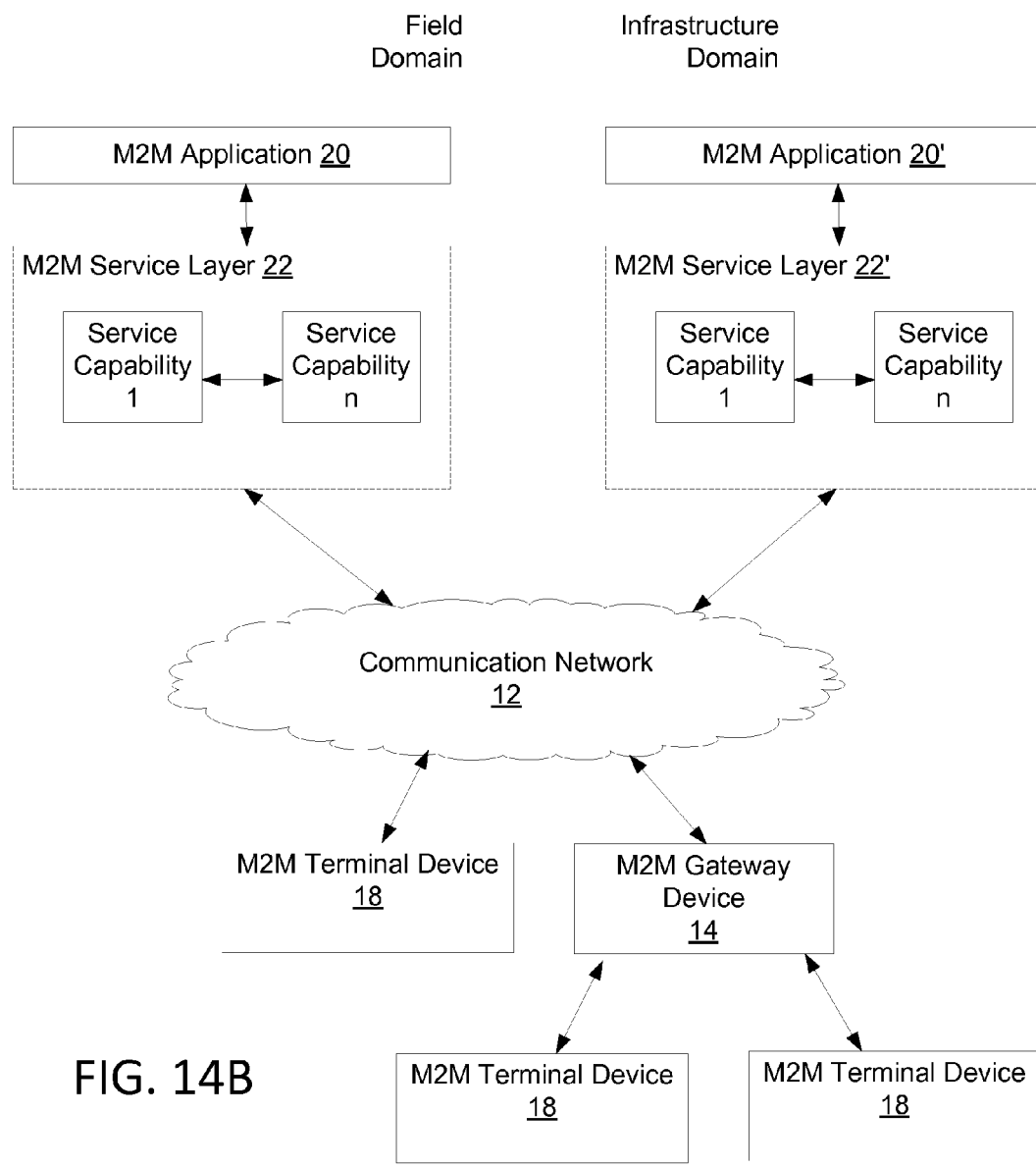
FIG. 14B is a system diagram of an example architecture that may be used within the M2M/IoT/WoT communications system illustrated in FIG. 14A.

Referring to FIG. 14B, the illustrated M2M service layer 22 in the field domain provides services for the M2M application 20, M2M gateway devices 14, and M2M terminal devices 18 and the communication network 12. A P2P application, as described herein, may be a M2M Application 20 or a service capability of the M2M Service Layer 22. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, and the like.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 14B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery, and the like. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Proximity services, as described herein, may be implemented as part of a service layer. The service layer is a software middleware layer that supports value-added service capabilities through a set of Application Programming Interfaces (APIs) and underlying networking interfaces. An M2M entity (e.g., an M2M functional entity such as a device, gateway, or service/platform that may be implemented by a combination of hardware and software) may provide an application or service. Both ETSI M2M and oneM2M use a service layer that may contain proximity services as described herein. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g., infrastructure node, middle node, application-specific node). Further, the service layer can implemented as part of an M2M network that uses a Service Oriented Architecture (SOA) and/or a resource-oriented architecture (ROA) to access services such as the proximity services described herein.

Figure 14C:
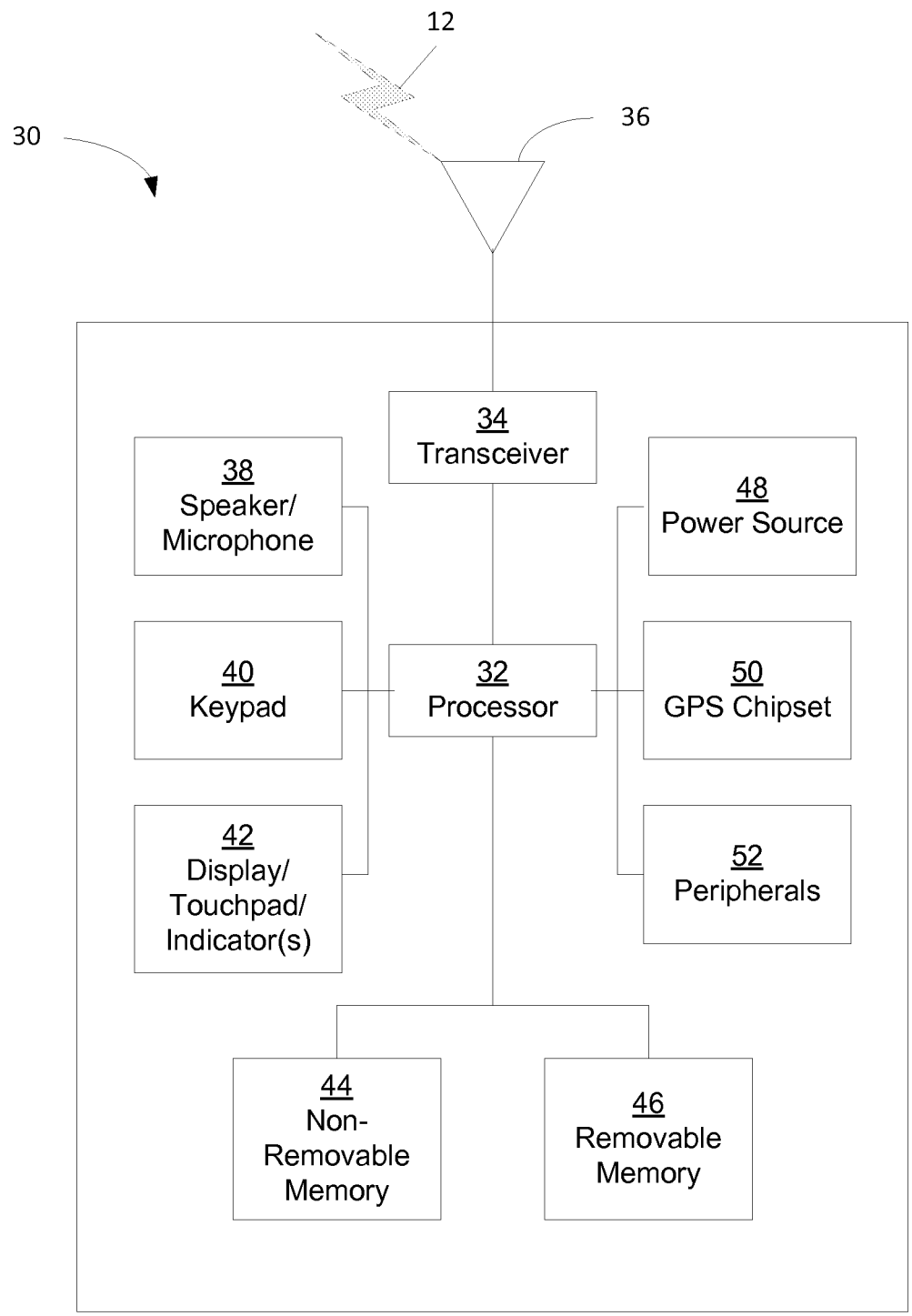
FIG. 14C is a system diagram of an example M2M/IoT/WoT terminal or gateway device or a peer that may be used within the communications systems illustrated in FIGS. 1, 2, 3, 14A, and 14B.

FIG. 14C is a system diagram of an example M2M device 30, such as an M2M terminal device 18 or an M2M gateway device 14 shown in FIGS. 14A and 14B, or a peer, such as any one of those illustrated in FIG. 1, 2, or 3. As shown in FIG. 14C, the M2M device or peer 30 may include a processor 32, a transceiver 34, a transmit/receive element 36, a speaker/microphone 38, a keypad 40, a display/touchpad and/or indicators 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed embodiments. This device may be a device that uses the disclosed systems and methods for P2PNW communications in proximity.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 14C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22 or another peer. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 14C as a single element, the M2M device 30 may include any number of transmit/receive elements 36. More specifically, the M2M device 30 may employ MIMO technology. Thus, in an embodiment, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer. The processor 32 may be configured to control lighting patterns, images, or colors on the display or indicators 42 in response to communications received from other peers in proximity in accordance with the methods described above and illustrated in FIGS. 9, 10A-B, 11, 12A-B, and 13.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 14D:
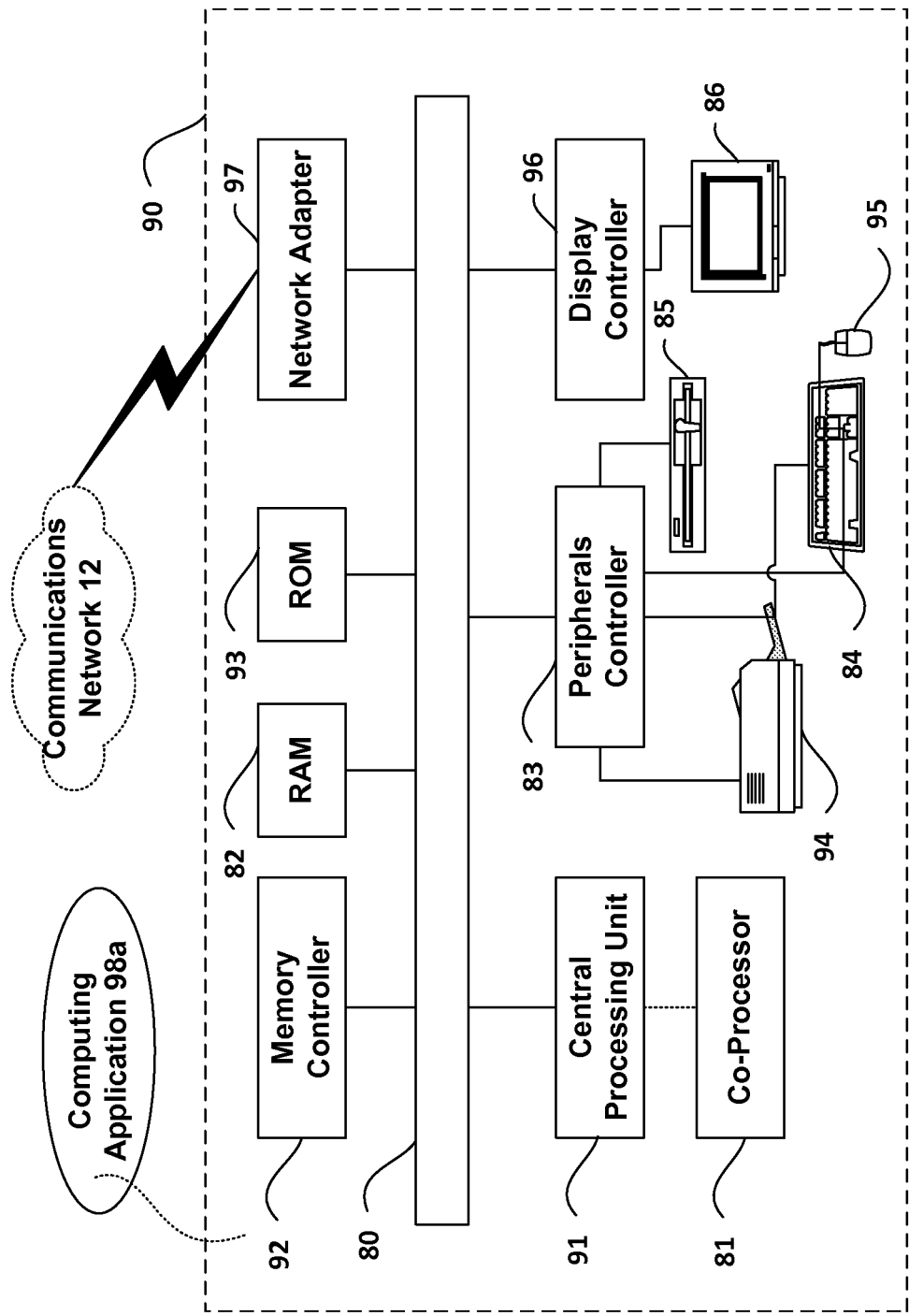
FIG. 14D is a block diagram of an example computing system in which aspects of the communication system of FIGS. 1, 2, 3, 14A, and 14B may be embodied.

FIG. 14D is a block diagram of an exemplary computing system 90 on which, for example, the M2M service platform 22 of FIG. 14A and FIG. 14B may be implemented. As mentioned above, certain peers (such as certain of those illustrated in FIGS. 1, 2, and 3) may also be implemented in the form of computing system 90 or the like. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process P2PNW communications in proximity as described above and illustrated in other figures.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 14A and FIG. 14B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, peer, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. One skilled in the art will recognize that the disclosed embodiments may be implemented in architectures and systems, such as 3GPP, ETSI M2M, oneM2M, MQTT, IRTF SDNRG, IRTF P2PRG, IETF COMAN, IEEE 802.11, IEEE 802.15, IEEE 802.16, IEEE 802 OmniRAN, and other M2M capable systems and architectures.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A peer of a peer-to-peer network under distributed control, wherein each peer in the peer-to-peer network under distributed control is configured to manage control-related communications with peers of different peer-to-peer networks under distributed control, the peer comprising a processor and a memory, the memory containing computer-executable instructions that when executed by the processor, cause the peer to perform steps comprising:

scanning a channel to detect a superframe beacon of a superframe of one or more peer-to-peer networks under virtually centralized control, wherein each of the one or more peer-to-peer networks under virtually centralized control comprises a super virtual leader configured to manage control-related communications between peers of different peer-to-peer networks under virtually centralized control;

decoding the detected superframe beacon to locate a position of a common control and data channel (CCDCH) of the superframe of the one or more peer-to-peer networks under virtually centralized control; and sending a request message over the CCDCH of the superframe of the one or more peer-to-peer networks under virtually centralized control to indicate the existence of the peer-to-peer network under distributed control and to request channels for use in the distributed control of the peers of the peer-to-peer network under distributed control.

2. The peer recited in claim 1, wherein the computer-executable instructions further cause the peer to perform a step of decoding a detected superframe beacon of a superframe of the peer-to-peer network under virtually centralized control to locate a position of a reserved time period allocated by the super virtual leader of the peer-to-peer network under virtually centralized control for use by the peers of the peer-to-peer network under distributed control.

3. The peer recited in claim 1, wherein the request message comprises one or more of an identifier associated with an application of the peer-to-peer network under distributed control, an indication of a category of the application, an indication of the number of active peers in the peer-to-peer network under distributed control, an indication of whether the distributed control will be frame-based or non-frame-based, an indication of whether the distributed control will be contention-based or non-contention-based, an indication of a number of channel time slots requested, an indication of a number of sub-carriers requested, and an indication of a number of resource blocks requested.

4. A peer operating as a super virtual leader of a peer-to-peer network under virtually centralized control in which the super virtual leader is configured to manage control-related communications between peers of different peer-to-peer networks under virtually centralized control, the peer operating as the super virtual leader comprising a processor and a memory, the memory containing computer-executable instructions that when executed by the processor, cause the peer to perform steps comprising:

receiving, over a common control and data channel (CCDCH) of a superframe of the peer-to-peer network under virtually centralized control, a request message from a second peer of a peer-to-peer network under distributed control, the request message indicating the existence of the peer-to-peer network under distributed control and requesting channels for use in the distributed control of the peer-to-peer network under distributed control, wherein each peer in the peer-to-peer network under distributed control is configured to manage control-related communications with peers of different peer-to-peer networks under distributed control;

in response to the request message, allocating reserved time on a channel for use by the peers of the peer-to-peer network under distributed control; and broadcasting information about the allocation of reserved time to the peers of the peer-to-peer network under distributed control.

5. The peer of claim 4, wherein the information about the allocation of reserved time includes one or more of an indication of a start time of the reserved time, an indication of the end time of the reserved time, and an indication of the duration of the reserved time.

6. The peer of claim 4, wherein said broadcasting comprises broadcasting the information about the allocation of reserved time in one of (i) a next beacon of a superframe of the peer-to-peer network under virtually centralized control, or (ii) the CCDCH of a superframe of the peer-to-peer network under virtually centralized control.

7. A peer operating as a super virtual leader of a peer-to-peer network under virtually centralized control in which the super virtual leader is configured to manage control-related communications between peers of different peer-to-peer networks under virtually centralized control, the peer operating as the super virtual leader comprising a processor and a memory, the memory containing computer-executable instructions that when executed by the processor, cause the peer to perform steps comprising:

scanning a channel used by the peers of a peer-to-peer network under distributed control to find a reserved time period on the channel, wherein each peer in the peer-to-peer network under distributed control is configured to manage control-related communications with peers of different peer-to-peer networks under distributed control;

determining whether the reserved time period is of sufficient length to accommodate a superframe for use by the peers of the peer-to-peer network under virtually centralized control; and if the reserved time period is of sufficient length, inserting a superframe beacon in the reserved time period to start a superframe for use by the peer-to-peer network under virtually centralized control, the insertion of the superframe beacon announcing the existence of the peer-to-peer network under virtually centralized control to the peers of the peer-to-peer network under distributed control.

8. The peer of claim 7, wherein the superframe beacon inserted by the peer defines the start of a hyperframe that comprises one superframe of the peer-to-peer network under virtually centralized control and one superframe of the peer-to-peer network under distributed control.

9. The peer of claim 7, wherein if the reserved time is not of sufficient length, the computer-executable instructions further cause the peer to perform steps comprising:

sending, via a common control and data channel (CCDCH) of a superframe of the peer-to-peer network under distributed control, a request for channels for use by the peer-to-peer network under virtually centralized control;

receiving a response to the request; and based on the response, defining a superframe for use by the peers of the peer-to-peer network under virtually centralized control.

10. A peer operating as a virtual leader of a peer-to-peer network under hybrid control in which the virtual leader is configured to manage control-related communications between peers of different peer-to-peer networks under hybrid control, the peer operating as the virtual leader comprising a processor and a memory, the memory containing computer-executable instructions that when executed by the processor, cause the peer to perform steps comprising:

scanning a channel to detect a superframe beacon of a superframe of one or more peer-to-peer networks under virtually centralized control, wherein one of the one or more peer-to-peer networks under virtually centralized control comprises a super virtual leader configured to manage control-related communications between peers of different peer-to-peer networks under virtually centralized control;

decoding the detected superframe beacon to locate a position of a common control and data channel (CCDCH) of the superframe of the one or more peer-to-peer networks under virtually centralized control; and sending a request message over the CCDCH of the superframe of the one or more peer-to-peer networks under virtually centralized control to indicate the existence of the peer-to-peer network under hybrid control and to request channels for use in the hybrid control of the peers of the peer-to-peer network under hybrid control.

11. The peer recited in claim 10, wherein the computer-executable instructions further cause the peer to perform a step of decoding a detected superframe beacon of a superframe of the peer-to-peer network under virtually centralized control to locate a position of a reserved time period allocated by the super virtual leader of the one or more peer-to-peer networks under virtually centralized control for use by the peers of the peer-to-peer network under hybrid control.

12. A peer operating as a super virtual leader of a peer-to-peer network under virtually centralized control in which the super virtual leader is configured to manage control-related communications between peers of different peer-to-peer networks under virtually centralized control, the peer operating as the super virtual leader comprising a processor and a memory, the memory containing computer-executable instructions that when executed by the processor, cause the peer to perform steps comprising:

receiving, over a common control and data channel (CCDCH) of a superframe of the peer-to-peer network under virtually centralized control, a request message from a second peer of a peer-to-peer network under hybrid control, the request message indicating the existence of the peer-to-peer network under hybrid control and requesting channels for use in the hybrid control of the peer-to-peer network under hybrid control, wherein the peer-to-peer network under hybrid control comprises a virtual leader configured to manage control-related communications between peers of the peer-to-peer network under hybrid control and peers of a different peer-to-peer network under hybrid control;

in response to the request message, allocating reserved time on a channel for use by the peers of the peer-to-peer network under hybrid control; and broadcasting information about the allocation of reserved time to the peers of the peer-to-peer network under hybrid control.

13. The peer of claim 12, wherein the information about the allocation of reserved time includes one or more of an indication of a start time of the reserved time, an indication of the end time of the reserved time, and an indication of the duration of the reserved time.

14. The peer of claim 12, wherein said broadcasting comprises broadcasting the information about the allocation of reserved time in one of (i) a next beacon of a superframe of the peer-to-peer network under virtually centralized control, or (ii) the CCDCH of a superframe of the peer-to-peer network under virtually centralized control.

15. A peer operating as a super virtual leader of a peer-to-peer network under virtually centralized control in which the super virtual leader is configured to manage control-related communications between peers of different peer-to-peer networks under virtually centralized control, the peer operating as the super virtual leader comprising a processor and a memory, the memory containing computer-executable instructions that when executed by the processor, cause the peer to perform steps comprising:

scanning a channel used by the peers of a peer-to-peer network under hybrid control to find a reserved time period on the channel, wherein the peer-to-peer network under hybrid control comprises a virtual leader configured to manage control-related communications between peers of the peer-to-peer network under hybrid control and peers of a different peer-to-peer network under hybrid control;

determining whether the reserved time period is of sufficient length to accommodate a superframe for use by the peers of the peer-to-peer network under virtually centralized control; and if the reserved time period is of sufficient length, inserting a superframe beacon in the reserved time period to start a superframe for use by the peer-to-peer network under virtually centralized control, the insertion of the superframe beacon announcing the existence of the peer-to-peer network under virtually centralized control to the peers of the peer-to-peer network under hybrid control.

16. The peer of claim 15, wherein the superframe beacon inserted by the peer defines the start of a hyperframe that comprises one superframe of the peer-to-peer network under virtually centralized control and one superframe of the peer-to-peer network under hybrid control.

17. The peer of claim 15, wherein if the reserved time is not of sufficient length, the computer-executable instructions further cause the peer to perform steps comprising:

sending, via a common control and data channel (CCDCH) of a superframe of the peer-to-peer network under hybrid control, a request for channels for use by the peer-to-peer network under virtually centralized control;

receiving a response to the request; and based on the response, defining a superframe for use by the peers of the peer-to-peer network under virtually centralized control.

18. A peer of a peer-to-peer network under distributed control, wherein each peer in the peer-to-peer network under distributed control is configured to manage control-related communications with peers of different peer-to-peer networks under distributed control, the peer comprising a processor and a memory, the memory containing computer-executable instructions that when executed by the processor, cause the peer to perform steps comprising:

scanning a channel to detect a superframe beacon of a superframe of a peer-to-peer network under hybrid control, wherein the peer-to-peer network under hybrid control comprises a virtual leader configured to manage control-related communications between peers of the peer-to-peer network under hybrid control and peers of a different peer-to-peer network under hybrid control;

decoding the detected superframe beacon to locate a position of a common control and data channel (CCDCH) of the superframe of the peer-to-peer network under hybrid control; and sending a request message over the CCDCH of the superframe of the peer-to-peer network under hybrid control to indicate the existence of the peer-to-peer network under distributed control and to request channels for use in the distributed control of the peers of the peer-to-peer network under distributed control.

19. The peer recited in claim 18, wherein the computer-executable instructions further cause the peer to perform a step of decoding a detected superframe beacon of a superframe of the peer-to-peer network under hybrid control to locate a position of a reserved time period allocated by the peers of the peer-to-peer network under hybrid control for use by the peers of the peer-to-peer network under distributed control.

20. The peer recited in claim 19, wherein the request message comprises one or more of an identifier associated with an application of the peer-to-peer network under distributed control, an indication of a category of the application, an indication of the number of active peers in the peer-to-peer network under distributed control, an indication of whether the distributed control will be frame-based or non-frame-based, an indication of whether the distributed control will be contention-based or non-contention-based, an indication of a number of channel time slots requested, an indication of a number of sub-carriers requested, and an indication of a number of resource blocks requested.

21. A peer operating as a virtual leader of a peer-to-peer network under hybrid control in which the virtual leader is configured to manage control-related communications between peers of different peer-to-peer networks under hybrid control, the peer operating as the virtual leader comprising a processor and a memory, the memory containing computer-executable instructions that when executed by the processor, cause the peer to perform steps comprising:

scanning a channel used by the peers of a peer-to-peer network under distributed control to find a reserved time period on the channel, wherein each peer in the peer-to-peer network under distributed control is configured to manage control-related communications with peers of different peer-to-peer networks under distributed control;

determining whether the reserved time period is of sufficient length to accommodate a superframe for use by the peers of the peer-to-peer network under hybrid control; and if the reserved time period is of sufficient length, inserting a superframe beacon in the reserved time period to start a superframe for use by the peer-to-peer network under hybrid control, the insertion of the superframe beacon announcing the existence of the peer-to-peer network under hybrid control to the peers of the peer-to-peer network under distributed control.

22. The peer of claim 21, wherein the superframe beacon inserted by the peer defines the start of a hyperframe that comprises one superframe of the peer-to-peer network under hybrid control and one superframe of the peer-to-peer network under distributed control.

23. The peer of claim 21, wherein if the reserved time is not of sufficient length, the computer-executable instructions further cause the peer to perform steps comprising:

sending, via a common control and data channel (CCDCH) of a superframe of the peer-to-peer network under distributed control, a request for channels for use by the peer-to-peer network under hybrid control;

receiving a response to the request; and based on the response, defining a superframe for use by the peers of the peer-to-peer network under hybrid control.

* * * * *